(12) United States Patent
Kambayashi et al.

(10) Patent No.: US 8,548,169 B2
(45) Date of Patent: Oct. 1, 2013

(54) COMMUNICATION APPARATUS, KEY SERVER, AND DATA

(75) Inventors: Toru Kambayashi, Kanagawa (JP); Tatsuyuki Matsushita, Tokyo (JP); Haruhiko Toyama, Kanagawa (JP); Toshinori Odaka, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 891 days.

(21) Appl. No.: 12/401,701

(22) Filed: Mar. 11, 2009

(65) Prior Publication Data
US 2009/0316897 A1 Dec. 24, 2009

(30) Foreign Application Priority Data
Jun. 19, 2008 (JP) ................................. 2008-160686

(51) Int. Cl.
*H04L 29/06* (2006.01)
(52) U.S. Cl.
USPC ........................................................ 380/255
(58) Field of Classification Search
USPC ................. 369/30.8; 380/255; 713/153, 171
See application file for complete search history.

(56) References Cited

U.S. PATENT DOCUMENTS

| | | | |
|---|---|---|---|
| 7,165,050 B2 | 1/2007 | Marking | |
| 2003/0177422 A1* | 9/2003 | Tararoukhine et al. | 714/48 |
| 2003/0208693 A1* | 11/2003 | Yoshida | 713/201 |
| 2006/0064383 A1* | 3/2006 | Marking | 705/57 |
| 2009/0141889 A1* | 6/2009 | Nakamura | 380/44 |
| 2009/0210697 A1* | 8/2009 | Chen et al. | 713/153 |
| 2009/0249490 A1* | 10/2009 | Umesawa et al. | 726/26 |
| 2009/0282250 A1* | 11/2009 | Sato et al. | 713/171 |
| 2009/0327730 A1* | 12/2009 | Deishi | 713/171 |
| 2010/0008509 A1* | 1/2010 | Matsushita et al. | 380/279 |

FOREIGN PATENT DOCUMENTS

| | | |
|---|---|---|
| JP | 2002-204228 | 7/2002 |
| JP | 2007-251921 | 9/2007 |
| JP | 2008-192129 | 8/2008 |
| WO | 2010-067650 | 6/2010 |
| WO | 2010-067660 | 6/2010 |
| WO | 2010-067797 | 6/2010 |

OTHER PUBLICATIONS

English Translation of Office Action of Notice of Rejection for Japanese Patent Application No. 2008-160686 Dated Mar. 26, 2013, 8 pgs.

* cited by examiner

*Primary Examiner* — Michael S McNally
(74) *Attorney, Agent, or Firm* — Turocy & Watson, LLP

(57) ABSTRACT

A communication apparatus that encrypts a plurality of pieces that constitute a part of data and transmits the encrypted pieces stores an encrypted piece that is one of the pieces encrypted by another communication apparatus, and first decryption key information used for decrypting the encrypted piece, while keeping the encrypted piece and the first decryption key information in correspondence with each other. Further, the communication apparatus generates temporary information that can be different at each time of generation, further performs an encrypting process on the encrypted piece based on the temporary information, and outputs a new encrypted piece. The communication apparatus transmits the new encrypted piece, the first decryption key information that is stored in correspondence with the encrypted piece, and second decryption key information used for decrypting the encrypting process.

13 Claims, 10 Drawing Sheets

NODE 50 → NODE 51A

ID #0
EP(y_0)W_0
E(W_0)P

NODE 51A → NODE 51B

ID #0, ID #1
EP(y_0)W_0, EP(y_1)W_1
E(W_1)E(W_0)P

NODE 51B → KEY SERVER 53

ID #0, ID #1
EP(y_0)W_0,
EP(y_1)W_1

KEY SERVER 53 → NODE 51B

W_0, W_1

ID#0, ..., ID#(j-1)
EP(y_0)W_0, ..., EP(y_{j-1})W_{j-1}
E(W_{j-1})...E(W_0)P

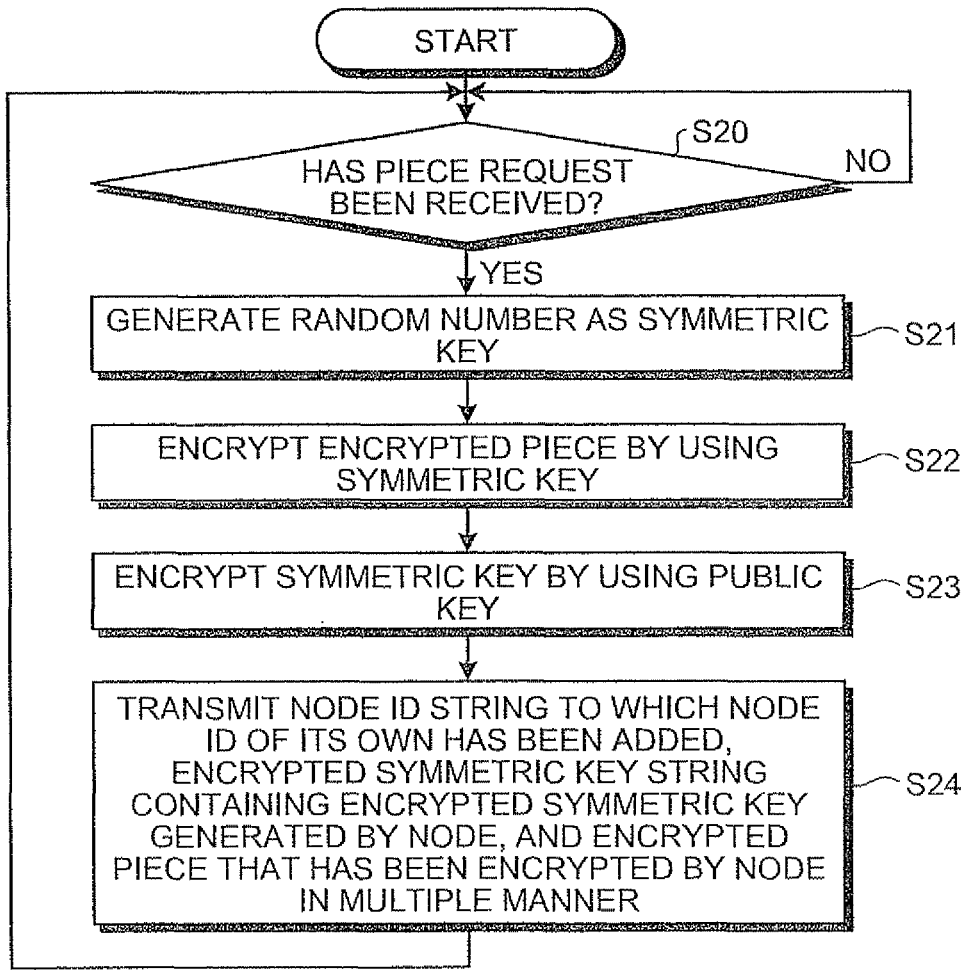

ID#0, ..., ID#(j-1), ID#j
EP(y_0)W_0, ..., EP(y_{j-1})W_{j-1}, EP(y_j)W_j

W_0, ..., W_{j-1}, W_j

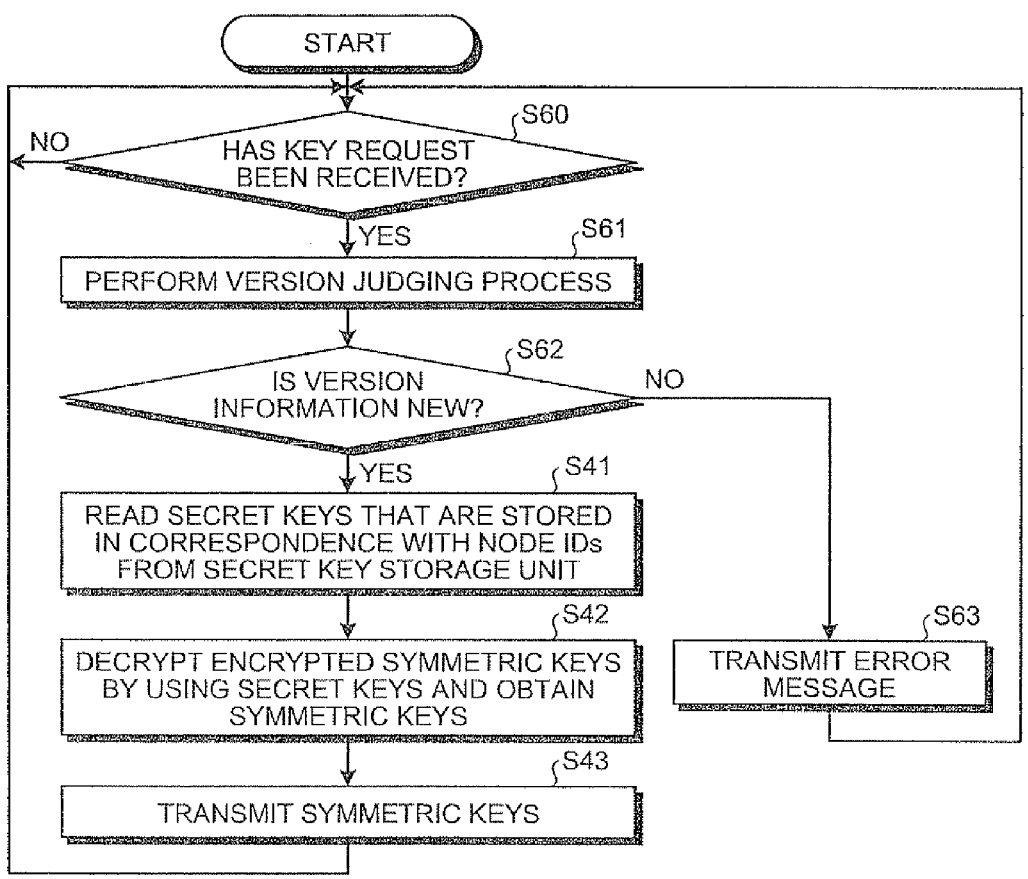

COMMUNICATION APPARATUS, KEY SERVER, AND DATA

CROSS-REFERENCE TO RELATED APPLICATIONS

This application is based upon and claims the benefit of priority from the prior Japanese Patent Application No. 2008-160686, filed on Jun. 19, 2008; the entire contents of which are incorporated herein by reference.

BACKGROUND OF THE INVENTION

1. Field of the Invention

The present invention relates to a communication apparatus that encrypts a plurality of pieces that constitute a part of distributed data and transmits the encrypted pieces or receives such encrypted pieces; a key server that transmits a decryption key used for decrypting such encrypted pieces; and data related thereto.

2. Description of the Related Art

For example, a distribution method for distributing data by using a Peer to Peer (P2P) network (hereinafter, performing a "P2P distributing process") does not require a data distribution server having a huge storage capacity and a large communication band and is therefore very cost effective. In addition, a node that receives distribution of data is expected to receive the supply of data from a plurality of nodes. Thus, the node is expected to obtain the data at a high speed while taking advantage of the bandwidth during downloading and uploading processes. As explained here, such a P2P data distribution method has great advantages, but seems to be insecure in view of data security related to, for example, copyright protections. A general premise that is used when we discuss not only P2P distribution methods, but the data security including copyright protections is as follows: There is no possibility that all the terminal devices or all the nodes are hacked. If this premise were denied, the terminal devices would be unable to store therein data that needs to be kept secret or to perform a process that needs to be kept secret, and almost all of the security techniques and inventive approaches to assure security would not work.

An example in which a P2P distributing process is used is a content distribution system in which encrypted data is distributed, and a node that receives the distribution of the data obtains a decryption key used for decrypting the data (hereinafter, "distributed data"). With regard to the P2P distributing process performed in such a system, one of the big problems related to data security is that there are only one or a few combinations each made up of distributed data and a decryption key used for decrypting the distributed data. Let us discuss a situation in which a node has been hacked, and the decryption key has been disclosed. In this situation, it is possible to use the disclosed decryption key for decrypting almost any distributed data. One of the solutions to this problem is to individualize the distributed data for each of the nodes.

An example of a technique used for individualizing distributed data for each of the nodes during a P2P distributing process is a method that was invented by Marking and is disclosed in U.S. Pat. No. 7,165,050. According to this method, the distributed data is divided into pieces, and an encrypting process is performed thereon by using a matrix of keys, so that encrypted pieces are generated. As a result, a piece group that is made up of the encrypted pieces that have been encrypted in the manner of a matrix is generated. The generated piece group is distributed via a P2P network. One of the nodes that are connected to the P2P network obtains, for each of the pieces, one of the plurality of encrypted pieces that have been encrypted in the manner of the matrix. As a result, the combination of encrypted pieces obtained by encrypting the pieces that constitute the distributed data is statistically expected to be unique for each of the nodes.

According to the technique disclosed in U.S. Pat. No. 7,165,050, however, it is only statistically expected that the combination of encrypted pieces is unique for each of the nodes. To make sure that the combination of encrypted pieces is unique for each of the nodes, it is possible to use, for example, one of the following two methods: One is to apply an inventive approach to the method used for distributing the encrypted pieces. The other is to configure a key server that stores therein the decryption keys used for decrypting the encrypted pieces so that the key server applies a limitation to the distribution of the decryption keys. For example, there is a system in which, to decrypt a distributed piece group, a node informs a key server of the combination of encrypted pieces and obtains the decryption keys. In such a system, to prevent replay attacks that are realized by re-distribution of decryption keys, a method may be used by which the key server rejects any combination of encryption pieces that overlaps many of the decryption keys that have already been obtained. However, when any of these methods is used, there is a possibility that the distribution efficiency of the encrypted pieces may be significantly lowered from time to time and that the advantages of the P2P network may not be fully utilized. In addition, when the former of the two methods described above is used, there is a possibility that independence between the data protection and the data distribution method may be lost and that this loss of independence may impose a significant restriction on system construction.

SUMMARY OF THE INVENTION

According to one aspect of the present invention, a communication apparatus that encrypts a plurality of pieces that constitutes a part of data and transmits the encrypted pieces, the apparatus includes a first storage unit that correspondingly stores an encrypted piece that is one of the pieces encrypted by another communication apparatus, and first decryption key information used for decrypting the encrypted piece; a first generating unit that generates temporary information that can be different at each time of generation; an encrypting unit that further performs an encrypting process on the encrypted piece based on the temporary information and outputs a new encrypted piece; and a transmitting unit that transmits the new encrypted piece, the first decryption key information stored in the first storage unit in correspondence with the encrypted piece, and second decryption key information used for decrypting the encrypting process performed by the encrypting unit.

According to another aspect of the present invention, a communication apparatus that encrypts a plurality of pieces that constitutes a part of data and transmits the encrypted pieces, the apparatus includes a first generating unit that generates temporary information that can be different at each time of generation; an encrypting unit that performs an encrypting process on one of the pieces based on the temporary information and outputs an encrypted piece; and a transmitting unit that transmits the encrypted piece and decryption key information used for decrypting the encrypting process performed by the encrypting unit.

According to still another aspect of the present invention, a communication apparatus that receives a plurality of pieces constituting a part of data from communication apparatuses, the apparatus includes a first receiving unit that receives an encrypted piece that is one of the pieces on which encrypting processes have been performed by a plurality of other communication apparatuses, apparatus identification information that is uniquely assigned to each of the plurality of other communication apparatuses, and decryption key information with which it is possible to identify decryption keys respectively used for decrypting the encrypting processes performed by the plurality of other communication apparatuses based on a correspondence relationship with the apparatus identification information; a first storage unit that correspondingly stores the received encrypted piece, the apparatus identification information, and the decryption key information; a transmitting unit that transmits a key request to a key server, the key request requesting the decryption keys used for decrypting the encrypted piece and correspondingly containing the apparatus identification information and the decryption key information stored in correspondence with the encrypted piece; a second receiving unit that receives the decryption keys transmitted from the key server in response to the key request; and a decrypting unit that decrypts the encrypted piece by using the received decryption keys.

According to still another aspect of the present invention, a key server includes a first storage unit that correspondingly stores correspondence information that corresponds to assigned information assigned to each of a plurality of communication apparatuses that encrypt a plurality of pieces that constitute a part of data and transmit the encrypted pieces, and apparatus identification information that is uniquely assigned to each of the plurality of communication apparatuses; a receiving unit that receives a key request from another communication apparatus other than the plurality of communication apparatuses, the key request requesting decryption keys used for decrypting an encrypted piece that is one of the pieces on which encrypting processes have been performed by the plurality of communication apparatuses and correspondingly containing the apparatus identification information of the plurality of communication apparatuses and decryption key information, the decryption key information being related to the encrypting processes respectively performed by the plurality of communication apparatuses and having been generated by using temporary information that can be different at each time of generation and the assigned information; an obtaining unit that, based on the key request, obtains the temporary information by using the correspondence information stored in correspondence with the apparatus identification information contained in the key request, and the decryption key information contained in the key request in correspondence with the apparatus identification information; and a transmitting unit that transmits, to the another communication apparatus, the decryption keys based on the obtained temporary information.

According to still another aspect of the present invention, data that is obtained by encrypting a piece that constitutes a part of distributed data and is transmitted from a communication apparatus, the data includes an encrypted piece that is the piece encrypted by each of a plurality of communication apparatuses, based on temporary information that can be different at each time of generation in correspondence with each of the plurality of communication apparatuses; apparatus identification information that is uniquely assigned to each of the plurality of communication apparatuses; and decryption key information with which it is possible to identify decryption keys used for decrypting encrypting processes that have respectively been performed in correspondence with the plurality of communication apparatuses based on a correspondence relationship with the apparatus identification information, the encrypted piece, the apparatus identification information, and the decryption key information contained in the data being kept in correspondence with one another.

According to still another aspect of the present invention, data that is transmitted from a communication apparatus to a key server, together with a key request, the key request requesting decryption keys used for decrypting an encrypted piece that is a piece constituting a part of distributed data and encrypted by each of a plurality of other communication apparatuses, based on temporary information that can be different at each time of generation in correspondence with each of the plurality of other communication apparatuses, the data includes apparatus identification information that is uniquely assigned to each of the plurality of other communication apparatuses; and decryption key information with which it is possible to identify the decryption keys used for decrypting encrypting processes that have respectively been performed on the piece, based on a correspondence relationship with the apparatus identification information, the apparatus identification information and the decryption key information contained in the data being kept in correspondence with each other.

BRIEF DESCRIPTION OF THE DRAWINGS

FIG. 12 is a flowchart of a procedure in a distributing process performed by the node 51 that is other than a distribution starting node, according to the first embodiment;

FIG. 13 is a schematic drawing of information transmitted by a node according to the first embodiment;

FIG. 25 is a flowchart of a procedure in a key transmitting process in which the key server 53 transmits decryption keys in response to a key request from the node 51, according to the second embodiment.

DETAILED DESCRIPTION OF THE INVENTION

Exemplary embodiments of a communication apparatus, a key server, and data according to the present invention will be explained in detail, with reference to the accompanying drawings.

Figure 1:
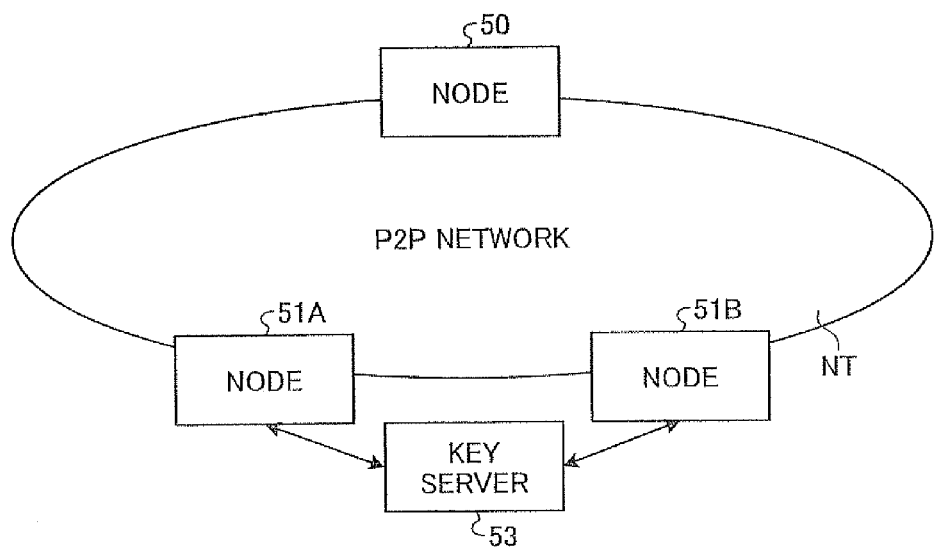
FIG. 1 is a diagram of a data distribution system according to a first embodiment of the present invention.

FIG. 1 is a diagram of a data distribution system according to a first embodiment of the present invention. In the data distribution system according to the first embodiment, a plurality of nodes 50, 51A, and 51B are connected together via a P2P network NT. Although not shown in the drawing, other nodes may be connected together via the P2P network NT. Also, each of the nodes 50, 51A, and 51B is connected to a key server 53. Each of the nodes 50, 51A, and 51B stores therein a node ID and a public key. The node ID is apparatus identification information that is uniquely assigned to each of the nodes. The public key is assigned information that is uniquely assigned to each of the nodes. Of the nodes 50, 51A, and 51B, the node 50 is a distribution starting node serving as an originating point of the distribution of data and stores therein data to be distributed (hereinafter, the "distributed data"). The distributed data may be in plain text or may be in encrypted text that has already been encrypted. For example, the distributed data may be video data that is protected by using a type of Digital Right Management (DRM) system that implements an encrypting process. The key server 53 stores therein secret keys as correspondence information that correspond to the public keys that are assigned to the nodes 50, 51A, and 51B, respectively. In the following explanation, when it is not necessary to distinguish the node 51A and the node 51B from each other, each of them will be simply referred to as the node 51.

Next, a hardware configuration of each of the apparatuses (i.e., the nodes 50, 51 and the key server 53) will be explained. Each of the apparatuses includes: a controlling device such as a Central Processing Unit (CPU) that exercises the overall control of the apparatus; storage devices such as a Read-Only Memory (ROM) and a Random Access Memory (RAM) that store therein various types of data and various types of computer programs (hereinafter, "programs"); external storage devices such as a Hard Disk Drive (HDD) and a Compact Disk (CD) drive device that store therein various types of data and various types of programs; and a bus that connects these constituent elements to one another. Each of the apparatuses has a hardware configuration to which a commonly-used computer can be applied. In addition, a display device that displays information, input devices such as a keyboard and a mouse that receive inputs of instructions from the user, and a communication interface (I/F) that controls communication with external apparatuses are connected to each of the apparatuses in a wired or wireless manner.

Figure 2:
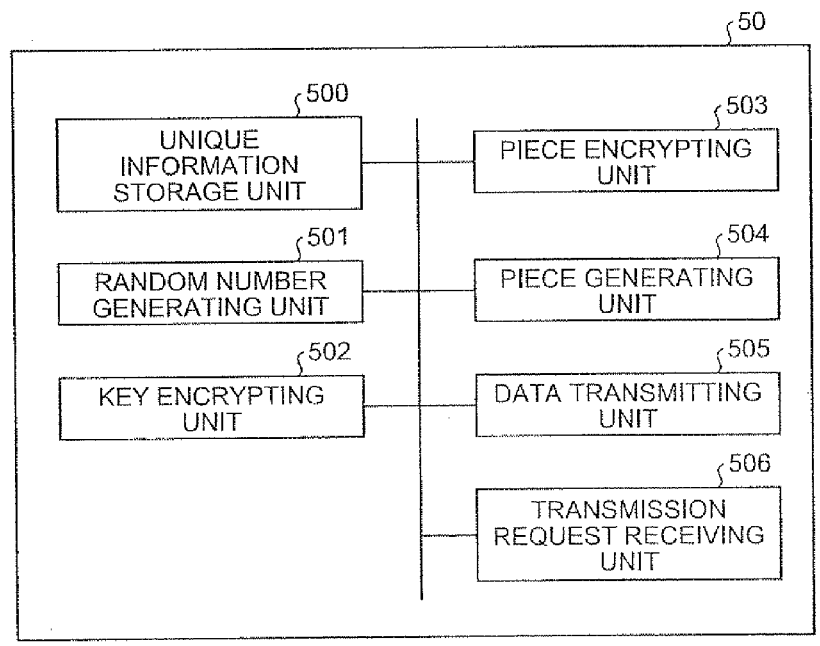
FIG. 2 is an exemplary functional diagram of a node 50 according to the first embodiment.

Next, various types of functions that are realized in the hardware configuration described above when the CPU of the node 50 serving as a distribution starting node executes the various types of programs stored in the storage devices and the external storage devices will be explained. FIG. 2 is an exemplary functional diagram of the node 50. The node 50 includes: a unique information storage unit 500; a random number generating unit 501; a key encrypting unit 502; a piece encrypting unit 503; a piece generating unit 504; a data transmitting unit 505; and a transmission request receiving unit 506. The unique information storage unit 500 is provided as, for example, a storage area within an external storage device such as the HDD included in the node 50. The actual substance of each of the constituent elements such as the random number generating unit 501, the key encrypting unit 502, the piece generating unit 504, the piece encrypting unit 503, the data transmitting unit 505, and the transmission request receiving unit 506 is generated in a storage device (e.g., the RAM) when the CPU of the node 50 executes the programs. Also, the distributed data is stored in an external storage device included in the node 50 in advance.

The unique information storage unit 500 stores therein the node ID and the public key that have been assigned to the node 50. The piece generating unit 504 divides the distributed data into a plurality of pieces. There is no particular limitation as to the data size of each of the pieces obtained as a result of the dividing process; however, it is assumed that the data size is determined in advance. The transmission request receiving unit 506 receives a piece request from another node (e.g., the node 51), the piece request requesting any one the pieces that have been obtained as a result of the dividing process performed by the piece generating unit 504. When the transmission request receiving unit 506 has received a piece request, the random number generating unit 501 generates a random number as temporary information that can be different at each time of generation. The piece encrypting unit 503 encrypts the piece by using the random number generated by the random number generating unit 501 as a symmetric key and outputs an encrypted piece. The symmetric key serves as an encryption key used in the encrypting process and also serves as a decryption key used for decrypting the encrypting process that has been performed on the encrypted piece. The key encrypting unit 502 encrypts the symmetric key by using the public key stored in the unique information storage unit 500 and outputs an encrypted symmetric key, the symmetric key being the random number that has been generated by the random number generating unit 501. The encrypted symmetric key is decryption key information used for decrypting the encrypting process performed by the communication apparatus. It is possible to identify the encrypted symmetric key (i.e., the decryption key information) based on the correspondence relationship with the node ID. A method for identifying the decryption key will be explained in detail when the key server 53 is explained later. The data transmitting unit 505 transmits, to the other node 51 that has transmitted the piece request, the node ID that is stored in the unique information storage unit 500, the encrypted symmetric key that has been output by the key encrypting unit 502, and the encrypted piece that has been output by the piece encrypting unit 503.

Figures 3, 4, 5:
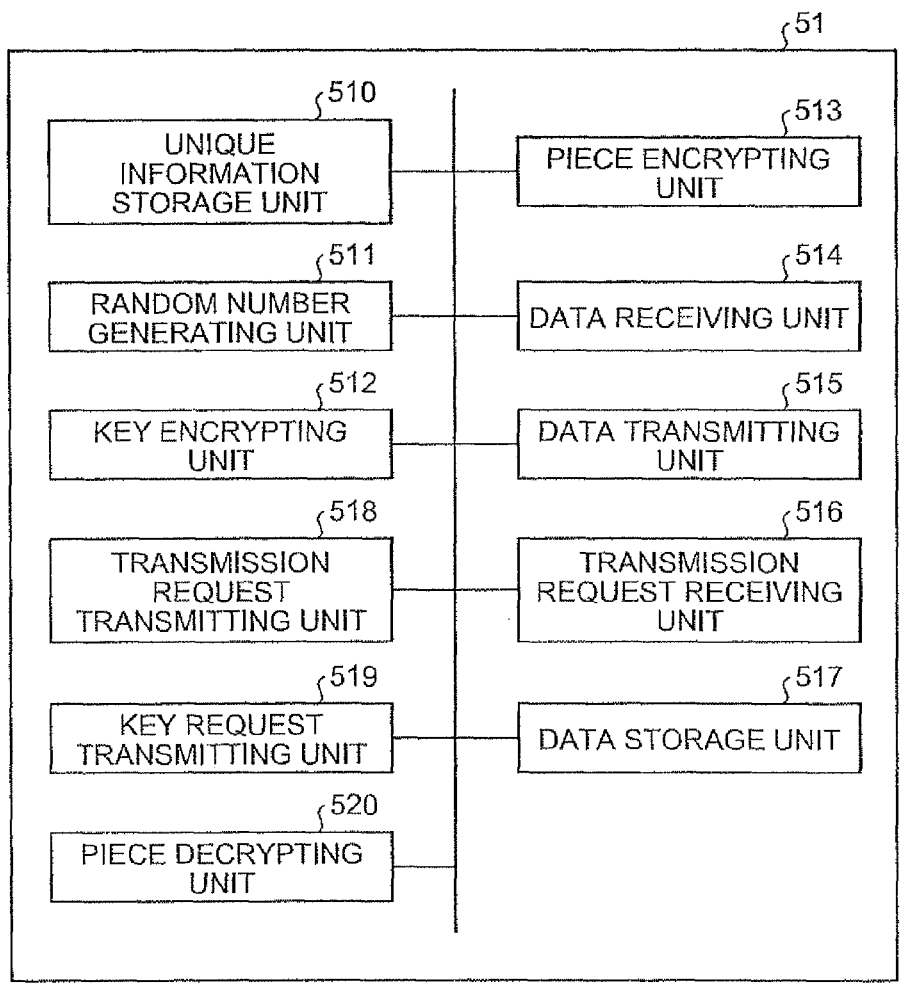
FIG. 3 is an exemplary functional diagram of a node 51 according to the first embodiment.
FIG. 4 is a schematic drawing of information transmitted from the node 50 to a node 51A according to the first embodiment.
FIG. 5 is a schematic drawing of information transmitted from the node 51A to a node 51B according to the first embodiment.

Next, the various types of functions that are realized when the CPU of the node 51, which is other than the distribution starting node, executes the various types of programs stored in the storage devices and the external storage devices will be explained. FIG. 3 is an exemplary functional diagram of the node 51. The node 51 includes: a unique information storage unit 510, a random number generating unit 511, a key encrypting unit 512, a piece encrypting unit 513, a data receiving unit 514, a data transmitting unit 515, a transmission request receiving unit 516, a data storage unit 517, a transmission request transmitting unit 518, a key request transmitting unit 519, and a piece decrypting unit 520. The unique information storage unit 510 and the data storage unit 517 are provided as, for example, storage areas within an external storage device such as the HDD included in the node 51. The actual substance of each of the constituent elements such as the random number generating unit 511, the key encrypting unit 512, the piece encrypting unit 513, the data transmitting unit 515, the transmission request receiving unit 516, the data receiving unit 514, the key request transmitting unit 519, and the piece decrypting unit 520 is generated in a storage device (e.g., the RAM) when the CPU of the node 51 executes the programs.

The unique information storage unit 510 stores therein the node ID and the public key that have been assigned to the node 51. The configurations of the transmission request receiving unit 516, the random number generating unit 511, the key encrypting unit 512 are substantially the same as the configurations of the transmission request receiving unit 506, the random number generating unit 501, and the key encrypting unit 502 that are included in the node 50 explained above, respectively. The transmission request transmitting unit 518 transmits a piece request requesting any one of the pieces to the node 50 or to another node 51. The data receiving unit 514 receives, from the node 50 or the other node 51 to which the transmission request transmitting unit 518 has transmitted the piece request, an encrypted piece that has been obtained by encrypting the piece; a node ID string containing one or more node IDs that are respectively assigned to one or more nodes (e.g., the node 50 and/or the other node 51) that have performed encrypting processes on the piece; and an encrypted symmetric key string containing encrypted symmetric keys obtained by encrypting the symmetric keys that have respectively been used in the encrypting processes performed on the piece. The data storage unit 517 stores therein the node ID string, the encrypted symmetric key string, and the encrypted piece that have been received by the data receiving unit 514, while keeping them in correspondence with one another. The piece encrypting unit 513 further encrypts any one of the encrypted pieces stored in the data storage unit 517 by using a random number generated by the random number generating unit 511 as a symmetric key and outputs a new encrypted piece. The data transmitting unit 515 transmits, to the other node 51 that has transmitted the piece request received by the transmission request receiving unit 516, a new node ID string that contains the node ID stored in the unique information storage unit 510 in addition to the node ID string stored in the data storage unit 517 in correspondence with the encrypted piece that is the target of the transmission; a new encrypted symmetric key string that contains the encrypted symmetric key that has been output by the key encrypting unit 512 in addition to the encrypted symmetric key string stored in the data storage unit 517 in correspondence with the encrypted piece; and the new encrypted piece that has been output by the piece encrypting unit 513. In the case where the data storage unit 517 stores therein no encrypted piece, even if the transmission request receiving unit 516 has received a piece request, the piece encrypting unit 513 outputs no encrypted piece, and the data transmitting unit 515 transmits no encrypted piece.

Next, the node ID string, the encrypted symmetric key string, and the encrypted piece that are transmitted from the node 50 or the node 51 will be explained more specifically. With regard to one encrypted piece, one node ID and one encrypted symmetric key are transmitted from the node 50, together with the one encrypted piece; however, in the following sections, for the sake of convenience of the explanation, they may be referred to as a node ID string and an encrypted symmetric key string, respectively. An example will be explained in which, in terms of the distribution path, an encrypted piece is transmitted from the node 50 to the node 51A, and further from the node 51A to the node 51B, whereas the node 51B transmits a key request to the key server 53. In the following explanation, the node ID assigned to the node 50 will be referred to as ID#0, whereas the public key assigned to the node 50 will be referred to as y_0, and the symmetric key that is a random number generated by the node 50 will be referred to as W_0. Further, the node ID assigned to the node 51A will be referred to as ID#1, whereas the public key assigned to the node 51A will be referred to as y_1, and the symmetric key that is a random number generated by the node 51A will be referred to as W_1.

In addition, the node ID assigned to the node 51B will be referred to as ID#2, whereas the public key assigned to the node 51B will be referred to as y_2, and the symmetric key that is a random number generated by the node 51B will be referred to as W_2. For example, let us discuss an example in which, with regard to a piece P, the node 50 encrypts the symmetric key W_0 by using the public key y_0 so as to output an encrypted symmetric key EP(y_0)W_0 and also encrypts the piece P by using the symmetric key W_0 so as to output an encrypted piece E(W_0)P, in response to a piece request from the node 51A. The expression EP(y_0)W_0 indicates that the symmetric key W_0 has been encrypted by using the public key y_0. Let us assume that the node 50 transmits, to the node 51A, the encrypted piece E(W_0)P together with the node ID ID#0 and the encrypted symmetric key EP(y_0)W_0. FIG. 4 is a schematic drawing of the information transmitted from the node 50 to the node 51A. The node 51 stores the node ID ID#0, the encrypted symmetric key EP(y_0)W_0, and the encrypted piece E(W_0)P into the data storage unit 517, while keeping them in correspondence with one another. The data storage unit 517 stores therein node ID strings and symmetric key strings, while keeping the correspondence relationship between each of the node IDs and the encrypted symmetric key that has been output by the node to which the node ID is assigned.

In the case where the node 51A is to transmit an encrypted piece corresponding to the piece P in response to a piece request from the node 51B, let us assume that the node 51A first encrypts the symmetric key W_1 by using the public key y_1 and outputs an encrypted symmetric key EP(y_1)W_1, and also, the node 51A further encrypts the encrypted piece E(W_0)P by using the symmetric key W_1 and outputs an encrypted piece E(W_1)E(W_0)P. E(W_1)E(W_0)P is obtained by encrypting the piece P in a multiple manner, by sequentially using the symmetric keys W_0 and W_1. In this situation, the node 51A transmits, to the node 51B, the node ID ID#1 that is stored in the unique information storage unit 500 and is assigned to the node 51A, in addition to the node ID ID#0 that is stored in the data storage unit 517 and is assigned to the node 50; the encrypted symmetric key EP(y_1)W_1 that has been output by the node 51A in addition to the encrypted symmetric key EP(y_0)W_0 that is stored in the data storage unit 517; and the encrypted piece E(W_1)E(W_0)P. FIG. 5 is a schematic drawing of the information transmitted from the node 51A to the node 51B. The node 51B stores the node ID string ID#0, ID#1, the encrypted symmetric key string EP(y_0)W_0, EP(y_1)W_1, and the encrypted piece E(W_1)E(W_0)P into the data storage unit 517, while keeping them in correspondence with one another. In the case where the node 51B is to transmit an encrypted piece corresponding to the piece P to another node (not shown), the node 51B transmits a node ID string ID#0, ID#1, ID#2, an encrypted symmetric key string EP(y_0)W_0, EP(y_1)W_1, EP(y_2)W_2, and an encrypted piece E(W_2)E(W_1)E(W_0)P.

As explained here, the node 51 performs the encrypting process on the encrypted piece in a multiple manner and transmits the encrypted piece to the other node 51. In this situation, to indicate the distribution path of the encrypted piece, the node 51 transmits, to the other node 51, the node ID string including the node IDs of the nodes 50 and 51 that have been involved in the encrypting processes of the encrypted piece while the node 50 that is the distribution starting node serves as the originating point, as well as the encrypted symmetric key string including the encrypted symmetric keys obtained by encrypting the symmetric keys used by the nodes 50 and 51 in the encrypting processes, together with the encrypted piece.

Figures 6, 7, 8, 9:
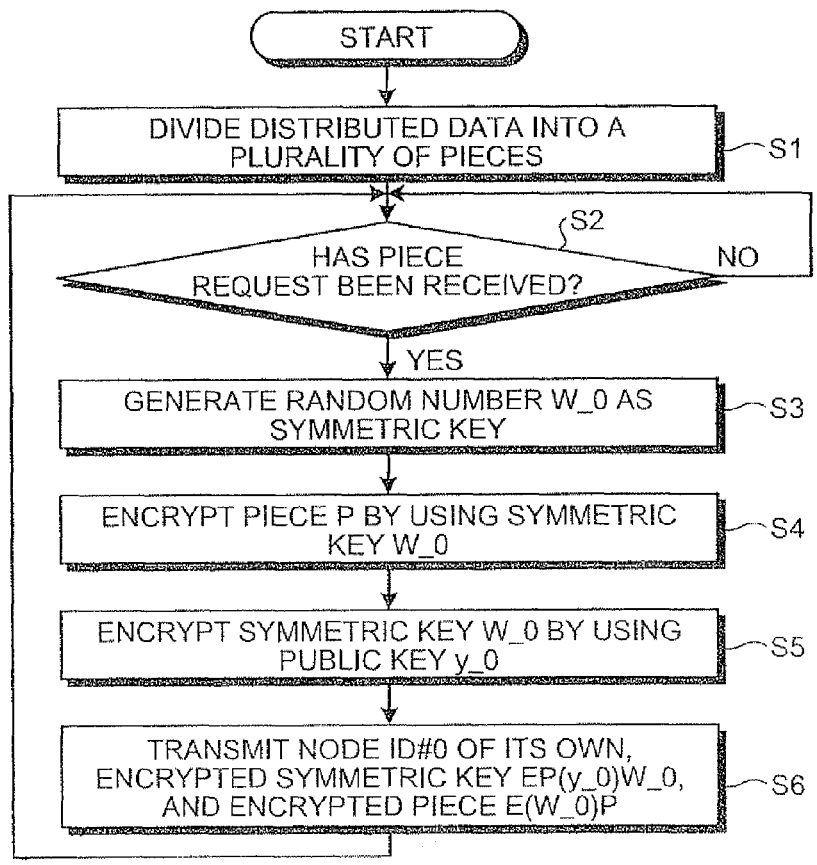
FIG. 6 is a schematic drawing of information transmitted from the node 51B to a key server 53 according to the first embodiment.
FIG. 7 is a schematic drawing of information transmitted from the key server 53 to the node 51B according to the first embodiment.
FIG. 8 is an exemplary functional diagram of the key server 53 according to the first embodiment.
FIG. 9 is a flowchart of a procedure in a distributing process that is performed by the node 50 serving as a distribution starting node, according to the first embodiment.

Returning to the description of FIG. 3, the key request transmitting unit 519 transmits a key request to the key server 53 to request the decryption keys used for decrypting the encrypted piece stored in the data storage unit 517. In this situation, the key request transmitting unit 519 puts the node ID string and the encrypted symmetric key string that are stored in the data storage unit 517 in correspondence with the encrypted piece into the key request and transmits the key request to the key server 53. For example, in the case where the node 51B transmits a key request to the key server 53 to request the decryption keys used for decrypting the encrypted piece E(W_1)E(W_0)P shown in FIG. 5, the key request transmitting unit 519 included in the node 51B transmits a key request that contains the node ID string ID#0, ID#1 and the encrypted symmetric key string EP(y_0)W_0, EP(y_1)W_1. FIG. 6 is a schematic drawing of the information transmitted from the node 51B to the key server 53. As shown in the drawing, to indicate the distribution path of the encrypted piece when requesting the decryption keys used for decrypting the encrypted piece from the key server 53, the node 51 transmits, to the key server 53, the node ID string including the node IDs of the nodes 50 and 51 that have been involved in the encrypting processes of the encrypted piece while the node 50 that is the distribution starting node serves as the originating point, as well as the encrypted symmetric key string including the encrypted symmetric keys obtained by encrypting the symmetric keys used by the nodes 50 and 51 in the encrypting processes. When transmitting the key request, the key request transmitting unit 519 transmits these types of information while keeping the correspondence relationship between each of the node IDs and the encrypted symmetric key that has been output by the node to which the node ID is assigned.

The piece decrypting unit 520 receives, as the decryption keys, the symmetric keys transmitted from the key server 53 in response to the key request transmitted by the key request transmitting unit 519 and decrypts the encrypted piece by using the symmetric keys. For example, the node 51B receives the symmetric keys W_0 and W_1 that have been transmitted from the key server 53 in response to the key request containing the node ID string and the encrypted symmetric key string shown in FIG. 6. It means that, in this situation, the node 51B receives the decryption keys that are used for decrypting the one or more encrypting processes that have been performed on the piece. FIG. 7 is a schematic drawing of the information transmitted from the key server 53 to the node 51B. By using the symmetric keys shown in FIG. 7, the encrypted piece is decrypted into the piece P.

There is no particular limitation as to from which node, in what order, and with what timing, the node 51 obtains each of the plurality of pieces. In the manner described above, by transmitting the piece requests, the node 51 receives, from the other nodes 50 and 51, the encrypted pieces each of which is obtained by encrypting a different one of the plurality of pieces. In addition, by transmitting a key request with respect to each of the encrypted pieces, the node 51 receives the symmetric keys from the key server 53, decrypts each of the encrypted pieces, and obtains the distributed data.

Next, various types of functions that are realized when the CPU of the key server 53 executes the various types of programs stored in the storage devices and the external storage devices will be explained. FIG. 8 is an exemplary functional diagram of the key server 53. The key server 53 includes a secret key storage unit 530, a data receiving unit 531, a key decrypting unit 532, and a data transmitting unit 533. The secret key storage unit 530 is provided as, for example a storage area within an external storage device such as the HDD included in the key server 53. The actual substance of each of the constituent elements such as the data receiving unit 531, the key decrypting unit 532, and the data transmitting unit 533 is generated in a storage device (e.g., the RAM) when the CPU of the key server 53 executes the programs.

The secret key storage unit 530 stores therein the secret keys that respectively correspond to the public keys assigned to the nodes 50 and 51 respectively, while keeping the secret keys in correspondence with the node IDs that are assigned to the nodes 50 and 51 respectively. The data receiving unit 531 receives, from the node 51, the key request requesting the decryption keys used for decrypting the encrypted piece and containing the node ID string and the encrypted symmetric key string as described above. For each of the node IDs included in the node ID string contained in the key request that has been received by the data receiving unit 531, the key decrypting unit 532 reads the secret key that is stored in the secret key storage unit 530 in correspondence with the node ID, decrypts the encrypted symmetric key corresponding to the node ID by using the secret key corresponding to the node ID, and obtains symmetric keys. The data transmitting unit 533 transmits the symmetric keys obtained by the decrypting process performed by the key decrypting unit 532, to the node 51 that has transmitted the key request received by the data receiving unit 514.

For example, the secret key that corresponds to the public key y_0 assigned to the node 50 will be referred to as x_0, whereas the secret key that corresponds to the public key y_1 assigned to the node 51A will be referred to as x_1. In this situation, in response to the key request containing the node ID string and the encrypted symmetric key string as shown in FIG. 6, the key server 53 obtains the symmetric keys W_0 and W_1 in correspondence with the node IDs ID#0 and ID#1 and transmits the obtained symmetric keys to the node 51B. It should be noted that the number of symmetric keys serving as the decryption keys used for decrypting the encrypted piece obtained by encrypting each of the pieces may be different depending on the number of times the encrypting process has been performed on the piece. In other words, the number of symmetric keys may be one or may be more than one, depending on the distribution path of each of the encrypted pieces. When the symmetric keys used for decrypting all the encrypting processes that have been performed on the piece have been transmitted to the node 51B, the node 51B will become able to completely decrypt the encrypting processes that have been performed on the encrypted piece.

Next, procedures in the processes performed in the data distribution system according to the first embodiment will be explained. First, a procedure in the distributing process performed by the node 50 serving as the distribution starting node will be explained, with reference to FIG. 9. The node 50 divides the distributed data into a plurality of pieces (step S1). After that, when having received a piece request requesting one of the pieces from another node 51 (step S2: Yes), the node 50 generates a random number W_0 (step S3). The generated random number will be used as a symmetric key. Subsequently, the node 50 encrypts the piece P that is the target of the transmission, by using the symmetric key W_0 generated at step S3 and outputs an encrypted piece E(W_0)P (step S4). There is no particular limitation as to how to select the piece that is the target of the transmission. After that, the node 50 encrypts the symmetric key W_0 by using the public key y_0 stored in the unique information storage unit 500 and outputs an encrypted symmetric key EP(y_0)W_0 (step S5). Subsequently, the node 50 transmits, to the other node 51 that has transmitted the piece request received at step S2, the node ID ID#0 stored in the unique information storage unit 500, the encrypted symmetric key EP(y_0)W_0 that has been output at step S5, and the encrypted piece E(W_0)P that has been output at step S4, as shown in FIG. 4 (step S6). After that, the process returns to step S2, and the node 50 waits until a new piece request is received. The piece request received at step S2 does not necessarily have to be received from the same node (i.e., the node 51). Also, the piece P that is requested in the piece request does not necessarily have to be the same piece. In principle, the random number generated at step S3 is different every time the process at step S3 is performed.

Next, a procedure in the receiving process in which the node 51 receives an encrypted piece from the node 50 or another node 51 will be explained, with reference to FIG. 10. The node 51 transmits a piece request to the node 50 or to another node 51, to request a piece (step S10). After that, the node 51 receives a node ID string, an encrypted symmetric key string, and an encrypted piece from the node 50 or the other node 51 to which the piece request has been transmitted at step S10 (step S11). Subsequently, the node 51 stores therein the node ID string, the encrypted symmetric key string, and the encrypted piece that have been received at step S11, while keeping them in correspondence with one another (step S12).

In the case where the node 51 has transmitted the piece request to the node 50, the node 51 receives, with respect to the piece P, the node ID string, the encrypted symmetric key string, and the encrypted piece that are shown in FIG. 4 at step S11. In the following section, although not shown in the drawing, a generalized example will be described by using a node that is one of the nodes connected to the P2P network NT and is the j'th node to receive the piece P (where j is an integer that is 1 or larger). For the sake of convenience of the explanation, the node ID of the node will be referred to as ID#j. As shown in FIG. 11, the node to which the node ID ID#j is assigned receives, with respect to the piece P, the node ID string ID#0, . . . , ID#(j−1) and an encrypted symmetric key string EP(y_0)W_0, . . . , EP(y_{j−1})W_{j−1}, and an encrypted piece E(W_{j−1}) . . . E(W_0)P, from the (j−1)'th node to which the node ID ID#(j−1) is assigned. Because the node ID string ID#0, . . . , ID#(j−1) identifies which nodes have performed the encrypting processes and have transmitted the encrypted piece, the distribution path of the encrypted piece is indicated in this manner. Also, by referring to the encrypted symmetric key string EP(y_0)W_0, . . . , EP(y_{j−1})W_{j−1} that correspond to the node IDs ID#0, . . . , ID#(j−1), it is possible to identify the symmetric keys that have been used in the encrypting processes performed on the encrypted piece. The manner in which the symmetric keys are identified will be explained when the operation of the key server 53 is explained later.

Next, a procedure in the distributing process performed by the node 51, which is other than the distribution starting node, will be explained, with reference to FIG. 12. When the node 51 has received, from another node 51, a piece request requesting a piece (step S20: Yes), the node 51 generates a random number (step S21). The generated random number will be used as a symmetric key. After that, the node 51 encrypts the encrypted piece that is obtained by encrypting a piece P and is stored in the data storage unit 517 by using the symmetric key that has been generated at step S21 and outputs a new encrypted piece (step S22). Also, the node 51 encrypts the symmetric key obtained at step S21 by using the public key stored in the unique information storage unit 510 and outputs an encrypted symmetric key (step S23). Subsequently, the node 51 transmits, to the other node 51 that has transmitted the piece request received at step S20, a new node ID string that contains the node ID stored in the unique information storage unit 510 in addition to the node ID string stored in the data storage unit 517 in correspondence with the encrypted piece that is the target of the transmission; a new encrypted symmetric key string that contains the encrypted symmetric key that has been output at step S23 in addition to the encrypted symmetric key string stored in the data storage unit 517 in correspondence with the encrypted piece; and the new encrypted piece that has been output at step S22 (step S24).

For example, with respect to the piece P, the node to which the node ID ID#j is assigned as described above transmits, to the (j+1)'th node to which the node ID ID#(j+1) is assigned, a node ID string ID#0, . . . , ID#(j−1), ID#j, an encrypted symmetric key string EP(y_0)W_0, . . . , EP(y_{j−1})W_{j−1}, EP (y_j)W_j, and an encrypted piece E(W−j)E(W_{j−1}) . . . E(W_0)P, as shown in FIG. 13.

Next, a procedure in a decrypting process in which the node 51 obtains decryptions keys from the key server 53 and decrypts the encrypted piece by using the obtained decryption keys will be explained, with reference to FIG. 14. The node 51 reads the node ID string and the encrypted symmetric key string that are stored in the data storage unit 517 in correspondence with the encrypted piece (step S30) and transmits a key request to the key server 53, the key request containing the node ID string and the encrypted symmetric key string that have been read and requesting the decryption keys used for decrypting the encrypted piece (step S31). Subsequently, the node 51 receives, as the decryption keys, the symmetric keys that are transmitted from the key server 53 in response to the key request transmitted at step S30 (step S32) and decrypts the encrypted piece by using the received symmetric keys (step S33).

Figures 14, 15, 16:
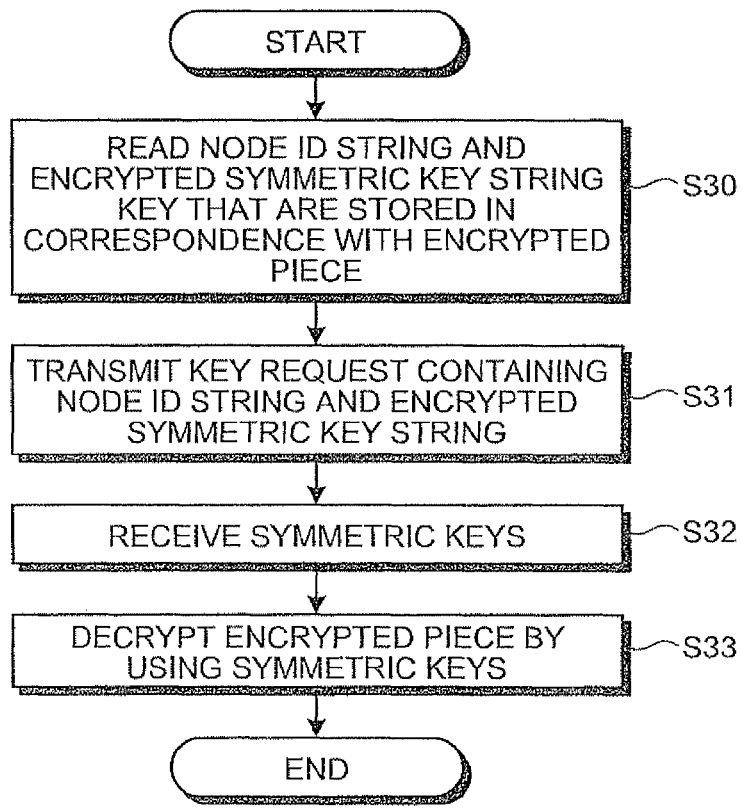
FIG. 14 is a flowchart of a procedure in a decrypting process in which the node 51 obtains decryption keys from the key server 53 and decrypts an encrypted piece by using the obtained decryption keys, according to the first embodiment.
FIG. 15 is a schematic drawing of information transmitted by a node according to the first embodiment.
FIG. 16 is a schematic drawing of symmetric keys received by a node according to the first embodiment.

For example, as shown in FIG. 15, with respect to the piece P, the node to which the node ID ID#(j+1) is assigned as described above transmits a node ID string ID#0, . . . , ID# (j−1), ID#j, and an encrypted symmetric key string EP(y_0) W_0, . . . , EP(y_{j−1})W_{j−1}, EP (y_j)W_j to the key server 53. After that, as shown in FIG. 16, the node receives, with respect to the piece P, the symmetric keys W_0, . . . , W_{j−1}, W_j from the key server 53, decrypts the encrypted piece E(W_j)E(W_{j−1}) . . . E(W_0)P by using the received symmetric keys, and obtains the piece P. In this manner, with respect to each of the encrypted pieces that are obtained by encrypting the plurality of pieces, each of the nodes 51 is able to obtain the distributed data by transmitting the key request, receiving the symmetric keys from the key server 53, and decrypting the encrypted piece.

Figure 17:
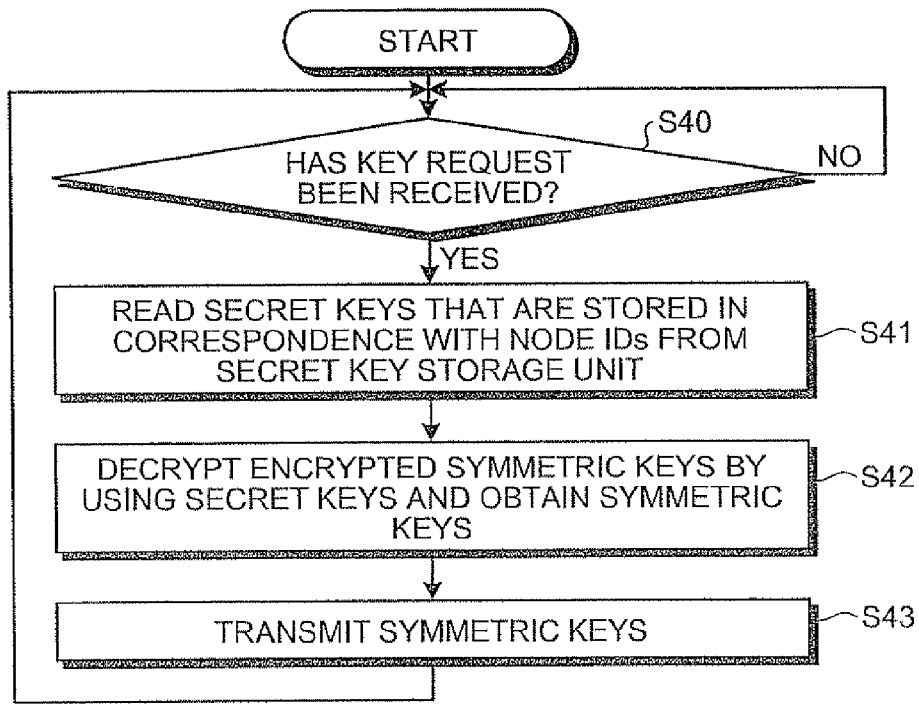
FIG. 17 is a flowchart of a procedure in a key transmitting process in which the key server 53 transmits decryption keys in response to a key request from the node 51, according to the first embodiment.

Next, a procedure in a key transmitting process in which the key server 53 transmits the decryption keys in response to a key request from the node 51 will be explained, with reference to FIG. 17. When the key server 53 has received, from the node 51, a key request requesting the decryption keys used for decrypting an encrypted piece and containing a node ID string and an encrypted symmetric key string (step S40: Yes), the key server 53 reads, for each of the node IDs included in the node ID string contained in the received key request, the secret key that is stored in the secret key storage unit 530 in correspondence with the node ID (step S41). After that, the key server 53 decrypts the encrypted symmetric key corresponding to the node ID by using the secret key corresponding to the node ID and obtains the symmetric keys (step S42). As explained here, the key server 53 identifies the symmetric keys based on the correspondence relationships between the encrypted symmetric keys and the node IDs and obtains the symmetric keys. Subsequently, the key server 53 transmits the symmetric keys that have been obtained at step S42 to the node 51 that has transmitted the key request received at step S40 (step S43).

For example, in response to a key request containing the node ID string and the encrypted symmetric key string as shown in FIG. 15, the key server 53 transmits, with respect to the piece P, the symmetric keys W_0, . . . , W_{j−1}, W_j as shown in FIG. 16 to the node to which the node ID ID#(j+1) is assigned.

As explained above, each of the nodes generates a random number every time the node distributes an encrypted piece and performs an encrypting process on the encrypted piece in a multiple manner by using the generated random number as a symmetric key. As a result, the combination of encrypted pieces obtained by any node is unique to the distribution path and the distribution time. It is therefore possible to make the combination of encrypted pieces unique, without fail. In addition, the symmetric keys serving as the decryption keys used for decrypting each of the encrypted pieces are encrypted by using the public key method before being transmitted and received. Thus, it is possible to maintain the security of the symmetric keys. With these arrangements, it is possible to enhance, without fail, the uniqueness for each of the nodes with respect to the combination of encrypted pieces obtained by the node and to improve the level of security, without having to apply any special inventive approach to the distribution method used in the P2P distributing process. Further, it is possible to maintain independence between the data protection and the data distribution method. Thus, it is possible to improve the level of freedom in the system construction.

For example, let us discuss an example in which each of the nodes 51 has received all the encrypted pieces each of which is obtained by encrypting a different one of the plurality of pieces. The distribution paths of the encrypted pieces are different from one another. Accordingly, there is a high possibility that the distribution path is different for each of the encrypted pieces. Thus, there is a high possibility that the combinations of node IDs that are respectively kept in correspondence with the encrypted pieces are different from one another. In addition, in the case where two or more encrypted pieces have mutually the same distribution path, the combination of node IDs that is kept in correspondence with each of the encrypted pieces is the same, but the encrypted symmetric keys corresponding to the nodes are different from each other, because each of the symmetric keys is a random number that is for only one time. In other words, even for the same node 51, the symmetric key is different every time the node 51 distributes an encrypted piece.

For example, let us assume that the distributed data is divided into as many pieces as N that are expressed as P1 to PN (where N is an integer that is 2 or larger). In this situation, let us assume, for example, that the node to which the node ID ID#j is assigned described above stores therein the following pieces of data with respect to a piece P1, while keeping them in correspondence with one another:
a node ID string: ID#0, ID#1, . . . , ID#(j−1);
an encrypted symmetric key string: EP(y_0)W_0, EP(y_1) W_1, . . . , EP(y_{j−1})W_{j−1}; and
an encrypted piece: E(W_{j−1}) . . . E(W_1)E(W_0)P1.

In addition, with respect to another piece P2, the node stores therein the following pieces of data, while keeping them in correspondence with one another, on the basis that the node is not the j'th node, but is the i'th node to receive the encrypted piece:
a node ID string: ID#0, ID'#1, . . . , ID'#(i−1);
an encrypted symmetric key string: EP(y_0)W_0, EP(y'_1) W'_1, . . . , EP(y'_{i−1})W'_{i−1}; and
an encrypted piece: E(W'_{k−1}) . . . E(W'_1)E(W_0)P2.

The node ID string ID'#1, . . . , ID'#(i−1) is different from the node ID string ID#1, . . . , ID#(j−1) and the node IDs therein correspond to the public keys y'_1, . . . , y'_{i−1}, respectively. Further, W'_1, . . . , W'_{i−1} denote the symmetric keys that have been generated as random numbers by the nodes to which the node IDs ID'#1, . . . , ID'#(i−1) are assigned respectively. The generated symmetric key is different at each time of generation.

Figure 18:
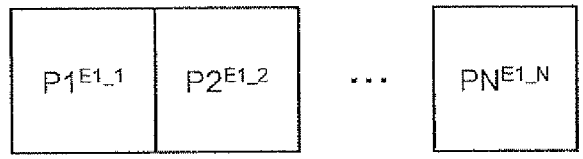
FIG. 18 is a conceptual drawing of a combination of encrypted pieces according to the first embodiment.
Figure 19:
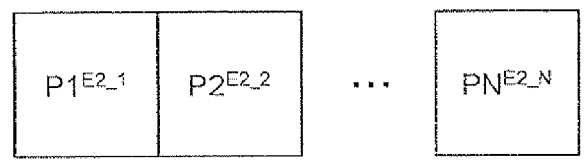
FIG. 19 is another conceptual drawing of a combination of encrypted pieces according to the first embodiment.

As explained above, even for the same node, the symmetric key used for decrypting an encrypted piece is different for each of the pieces. Further, for mutually different nodes, even with respect to the same piece, the state in which encrypting processes have been performed in a multiple manner is different for each of the encrypted pieces, and the symmetric keys used in the decrypting process is different for each of the encrypted pieces. Thus, for each of the nodes, the combination of encrypted pieces corresponding to the plurality of pieces (as many as N in the present example) is different. For example, as shown in FIG. 18, let us assume that, for one of the nodes, the encrypted pieces that correspond to the pieces P1, P2, . . . , PN are expressed as $P1^{E1-1}, P2^{E1-2}, \ldots, PN^{E1-N}$. As explained above, the decryption keys used for decrypting encrypted pieces $P1^{E1-1}, P2^{E1-2}, \ldots, PN^{E1-N}$ are different from one another, depending on the distribution path of the encrypted piece and the random numbers generated by the nodes that have been involved in the encrypting processes of the encrypted piece. Also, as shown in FIG. 19, let us assume that, for another one of the nodes, the encrypted pieces that correspond to the pieces P1, P2, . . . , PN are expressed as $P1^{E2-1}, P2^{E2-2}, \ldots, PN^{E2-N}$. With respect to the piece P1, the encrypted piece $P1^{E1-1}$ and the encrypted piece $P1^{E2-1}$ are different from each other. With respect to the piece P2, the encrypted piece $P2^{E1-2}$ and the encrypted piece $P2^{E2-2}$ are different from each other. With respect to the piece PN, the encrypted piece $PN^{E1-N}$ and the encrypted piece $PN^{E2-N}$ are different from each other. Thus, with regard to the combinations of encrypted pieces, the combination $P1^{E1-1}$, $P2^{E1-2}, \ldots, PN^{E1-N}$ and the combination $P1^{E2-1}$, $P2^{E2-2}, \ldots, PN^{E2-N}$ are different from each other. More specifically, the decryption keys used for decrypting the encrypted pieces $P1^{E2\_1}, P2^{E2\_2}, \ldots, PN^{E2\_N}$ are different from one another and are also different from the decryption keys used for decrypting the encrypted pieces $P1^{E1\_1}, P2^{E1\_2}, \ldots, PN^{E1\_N}$ described above. In other words, it is possible to ensure that the combination of encrypted pieces obtained by encrypting each of all the pieces that constitute the distributed data is different for each of the nodes, without fail. Thus, according to the first embodiment, it is possible to enhance, without fail, the uniqueness for each of the nodes with respect to the combination of encrypted pieces obtained by the node.

Next, a communication apparatus, a key server, and a program according to a second embodiment of the present invention will be explained. Parts of the second embodiment that are the same as the first embodiment will be explained by using the same reference characters or will be omitted from the explanation.

Figure 20:
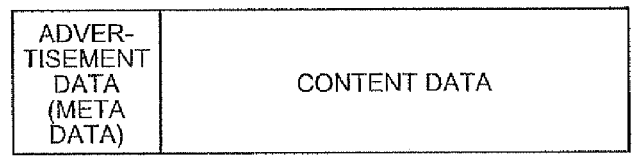
FIG. 20 is a conceptual drawing of distributed data that contains advertisement data according to a second embodiment of the present invention.
Figure 21:
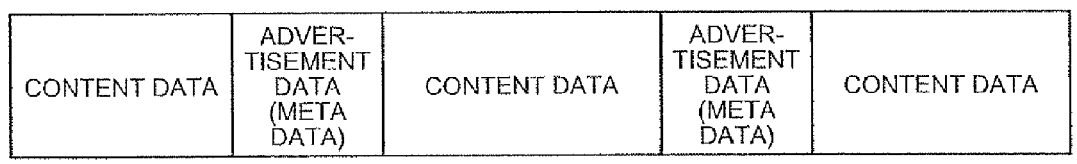
FIG. 21 is another conceptual drawing of distributed data that contains advertisement data according to the second embodiment.

To explain the second embodiment, an example in which the distributed data contains advertisement data for advertisement purposes will be explained. FIGS. 20 and 21 are conceptual drawings of distributed data that contains advertisement data. As shown in FIGS. 20 and 21, the distributed data contains content data and at least one unit of advertisement data. The content data may be, for example, video data, audio data, text data, or still image data. The content data may be in plain text or in encrypted text. The advertisement data may be meta data or may be video data. Examples of meta data include JAVA® (programming language) scripts and character data. The advertisement data contains version information that is configured in such a manner that the larger the numerical value is, the newer the version is, the version information being used as comparison management information that makes it possible to compare the level of newness thereof. Further, the distributed data contains a content 10 that is uniquely assigned. One content 10 may be contained in each of the pieces to be distributed. Alternatively, one content 10 may be contained in a series of advertisement pieces. The advertisement piece will be explained later. In the explanation below, it is assumed that one content 10 is contained in each of the pieces.

With these arrangements, the functional configurations of the node 50 serving as a distribution starting node that are different from those according to the first embodiment can be explained as below: The piece generating unit 504 included in the node 50 divides the distributed data into a plurality of pieces in such a manner that the units of advertisement data are separated from one another. More specifically, the piece generating unit 504 divides the distributed data into the plurality of pieces so that the following conditions (a) and (b) are satisfied:
(a) With respect to any one of the pieces that are obtained by dividing the distributed data, if the piece contains advertisement data, the piece does not contain content data.
(b) With respect to any one of the pieces that are obtained by dividing the distributed data, if the piece contains content data, the piece does not contain advertisement data.

It should be noted that the piece generating unit 504 may divide one unit of advertisement data into one piece or may divide one unit of advertisement data into a plurality of pieces. In the case where the piece generating unit 504 divides one unit of advertisement data into a plurality of pieces, the piece generating unit 504 arranges the pieces so that version information is contained in each of the pieces. Also, the piece generating unit 504 may divide one unit of content data into one piece or may divide one unit of content data into a plurality of pieces. In the following sections, for the sake of convenience of the explanation, the pieces obtained by dividing advertisement data will be referred to as "advertisement pieces", whereas the pieces obtained by dividing content data will be referred to as "content pieces". When it is not necessary to distinguish advertisement pieces and content pieces from each other, both of them will be simply referred to as "pieces".

The data transmitting unit 505 transmits, to another node 51 that has transmitted a piece request, the content ID contained in the distributed data, in addition to a node ID string, an encrypted symmetric key string, and an encrypted piece, in the same manner as described in the first embodiment.

Figure 22:
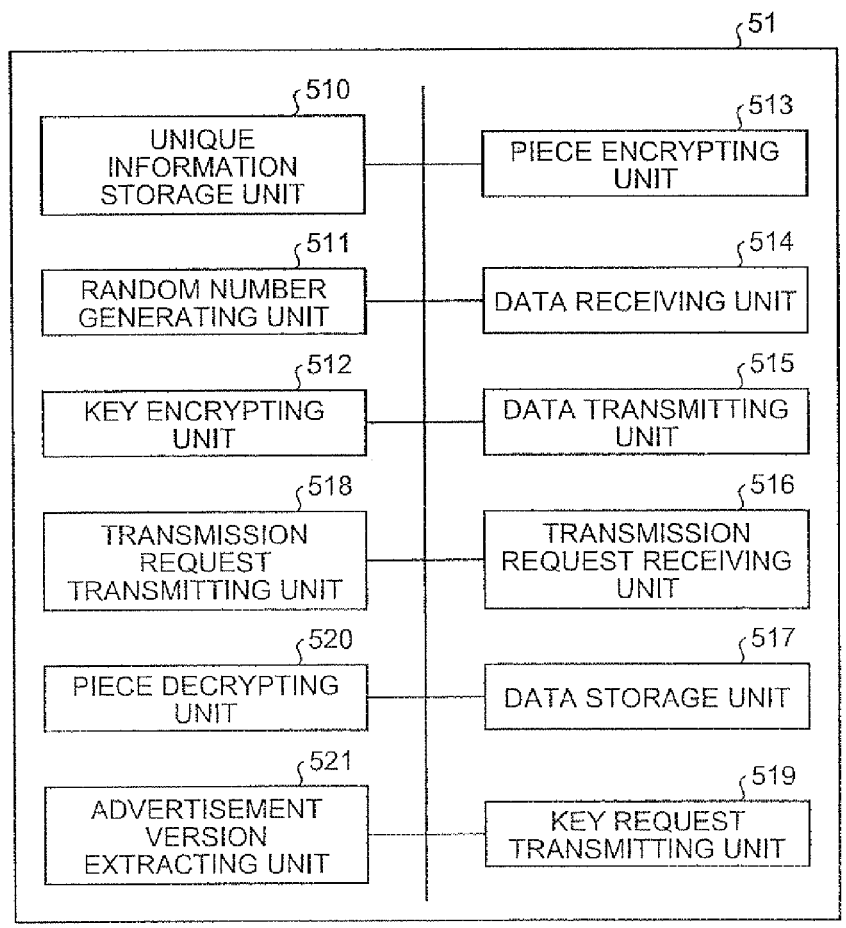
FIG. 22 is an exemplary functional diagram of the node 51 according to the second embodiment.

Next, the functional configurations of the node 51 that are different from those according to the first embodiment will be explained. FIG. 22 is an exemplary functional diagram of the node 51 according to the second embodiment. The node 51 includes an advertisement version extracting unit 521, in addition to the unique information storage unit 510, the random number generating unit 511, the key encrypting unit 512, the piece encrypting unit 513, the data receiving unit 514, the data transmitting unit 515, the transmission request receiving unit 516, the data storage unit 517, the transmission request transmitting unit 518, the key request transmitting unit 519, and the piece decrypting unit 520. From the node 50 or another node 51 to which the transmission request transmitting unit 518 has transmitted a piece request, the data receiving unit 514 receives a content ID in addition to a node ID string, an encrypted symmetric key string, and an encrypted piece. The data storage unit 517 stores therein the node ID string, the encrypted symmetric key string, the encrypted piece, and the content ID that have been received by the data receiving unit 514, while keeping them in correspondence with one another. The data transmitting unit 515 transmits, to the other node 51 that has transmitted the piece request received by the transmission request receiving unit 516, the node ID stored in the unique information storage unit 510 in addition to the node IDs stored in the data storage unit 517 in correspondence with the encrypted piece that is the target of the transmission (which are collectively called "a node ID string"); the encrypted symmetric key that has been output by the key encrypting unit 512 in addition to the encrypted symmetric keys stored in the data storage unit 517 in correspondence with the encrypted piece (which are collectively called "an encrypted symmetric key string"); the encrypted piece that has been output by the piece encrypting unit 513; as well as the content ID stored in the data storage unit 517 in correspondence with the encrypted piece.

In the case where the encrypted piece that has been received by the data receiving unit 514 is an encrypted piece obtained by encrypting an advertisement piece containing version information, the advertisement version extracting unit 521 extracts the version information. In the case where the key request transmitting unit 519 transmits, to the key server 53, a key request requesting the decryption keys used for decrypting the encrypted piece obtained by encrypting an advertisement piece, the key request transmitting unit 519 puts the following pieces of information into the key request and transmits the key request to the key server 53: the node ID string and the encrypted symmetric key string that are stored in the data storage unit 517 in correspondence with the encrypted piece; the content ID that is stored in the data storage unit 517 in correspondence with the encrypted piece; and the version information that has been extracted by the advertisement version extracting unit 521.

Figure 23:
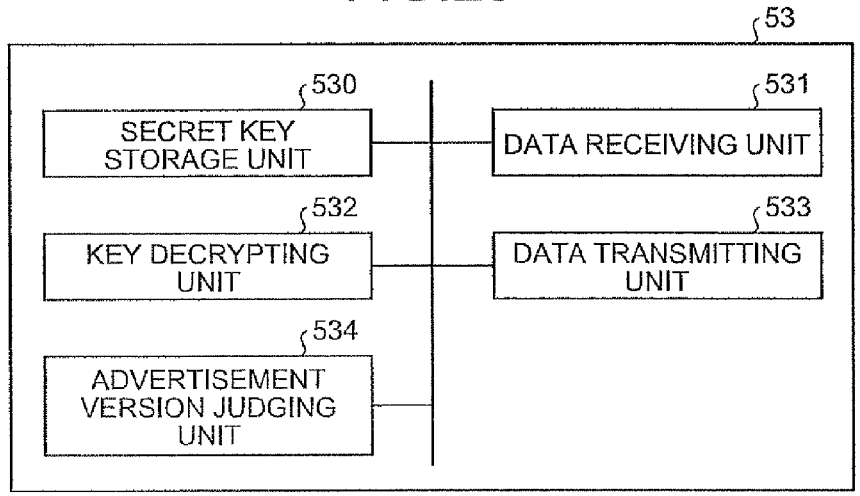
FIG. 23 is an exemplary functional diagram of the key server 53 according to the second embodiment.

Next, the functional configurations of the key server 53 that are different from those according to the first embodiment will be explained. FIG. 23 is an exemplary functional diagram of the key server 53 according to the second embodiment. The key server 53 includes: an advertisement version judging unit 534 in addition to the secret key storage unit 530, the data receiving unit 531, the key decrypting unit 532, and the data transmitting unit 533. With respect to an encrypted piece obtained by encrypting an advertisement piece, the data receiving unit 531 receives, from the node 51, a key request that contains a content ID and version information in addition to a node ID string and an encrypted symmetric key string. With respect to the advertisement data, the advertisement version judging unit 534 stores therein most updated version information indicating the most updated version for each of the content IDs. Further, the advertisement version judging unit 534 compares the version information that has been received by the data receiving unit 531 with the most updated version information that corresponds to the content ID received by the data receiving unit 531 together with the version information and performs a version judging process. More specifically, in the case where the numerical value of the received version information is equal to or larger than the numerical value of the most updated version, the advertisement version judging unit 534 judges that the advertisement piece to be decrypted from the encrypted piece for which the node 51 is requesting the decryption keys is an advertisement piece of a new version. In this situation, the advertisement version judging unit 534 determines that the symmetric keys serving as the decryption keys used for decrypting the encrypted piece should be transmitted to the node 51. On the contrary, in the case where the numerical value of the received version information is smaller than the numerical value of the most updated version, the advertisement version judging unit 534 judges that the advertisement piece to be decrypted from the encrypted piece for which the node 51 is requesting the decryption keys is an advertisement piece of an old version. In this situation, the advertisement version judging unit 534 determines that the symmetric keys should not be transmitted to the node 51. In the case where the advertisement version judging unit 534 has determined that the symmetric keys should be transmitted, the key decrypting unit 532 obtains the symmetric keys in the same manner as described in the first embodiment. The data transmitting unit 533 transmits the symmetric keys that have been obtained as a result of the decrypting process performed by the key decrypting unit 532 to the node 51 that has transmitted the key request received by the data receiving unit 531. On the contrary, in the case where the advertisement version judging unit 534 has determined that the symmetric keys should not be transmitted, the data transmitting unit 533 does not transmit the symmetric keys to the node 51 that has transmitted the key request received by the data receiving unit 531, but transmits an error message indicating as such.

Figure 24:
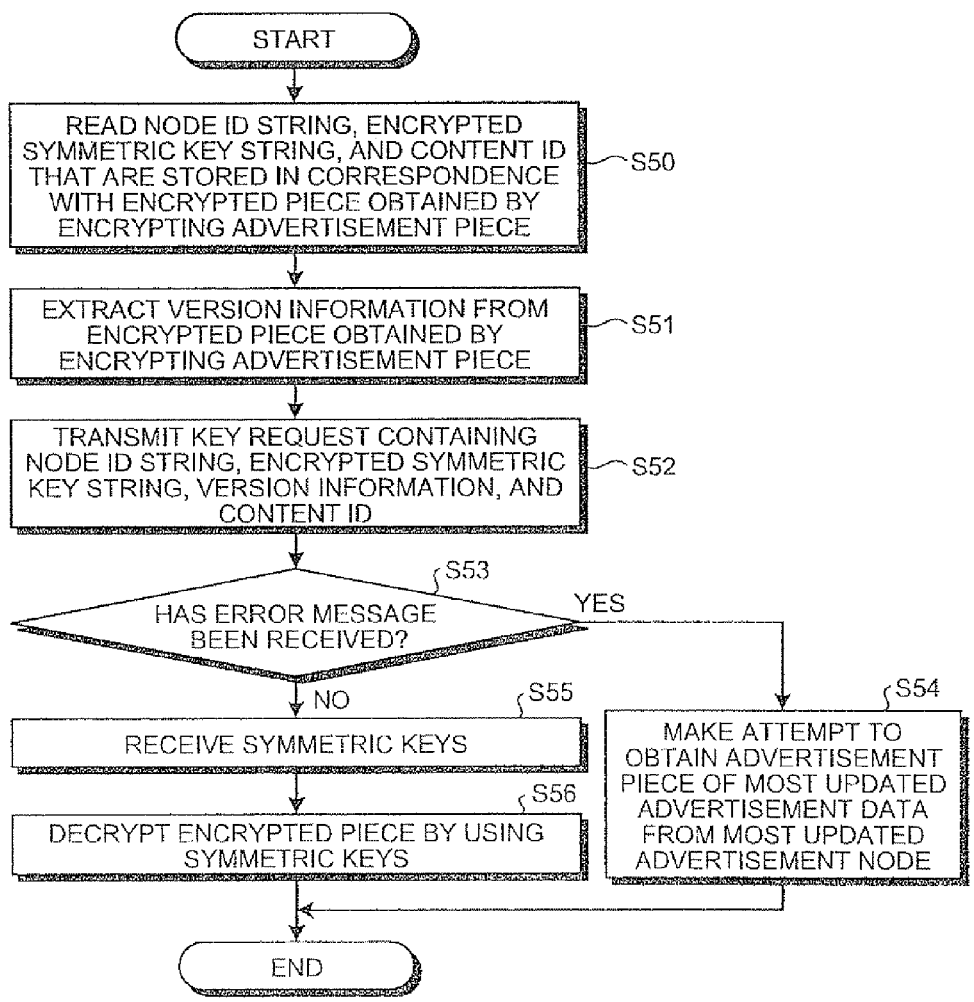
FIG. 24 is a flowchart of a procedure in a decrypting process performed by the node 51 according to the second embodiment.

Next, procedures in the processes performed in the data distribution system according to the second embodiment will be explained. First, a procedure in a decrypting process performed by the node 51 will be explained with reference to FIG. 24. In the following sections, an example will be explained in which the node 51 is to receive the decryption keys used for decrypting an encrypted piece obtained by encrypting an advertisement piece. The node 51 reads the node ID string, the encrypted symmetric key string, the content ID that are kept in correspondence with the encrypted piece that is stored in the data storage unit 517 and has been obtained by encrypting an advertisement piece (step S50) and extracts the version information from the encrypted piece (step S51). Subsequently, the node 51 transmits a key request to the key server 53, the key request containing the node ID string, the encrypted symmetric key string, the content ID, and the version information and requesting the decryption keys used for decrypting the encrypted piece (step S52). After that, in the case where the node 51 has received an error message indicating that the decryption keys requested in the key request transmitted at step S50 will not be transmitted (step S53: Yes), it means that the version of the advertisement piece is old. In this situation, the node 51 attempts to connect to a node (hereinafter, the "most updated advertisement node") that distributes the advertisement data (hereinafter, the "most updated advertisement data) that contains the most updated version information and attempts to receive an advertisement piece obtained by dividing the most updated advertisement data (step S54). On the contrary, in the case where the node 51 does not receive an error message at step S53, but has received the symmetric keys serving as the decryption keys that have been transmitted from the key server 53 in response to the key request transmitted at step S50 (step S55), the node 51 decrypts the encrypted piece by using the symmetric keys and obtains the advertisement piece (step S56).

Next, a procedure in a key transmitting process in which the key server 53 transmits the decryption keys in response to a key request received from the node 51 will be explained, with reference to FIG. 25. In the following sections, an example will be explained in which the key server 53 has received a key request requesting the decryption keys used for decrypting an encrypted piece obtained by encrypting an advertisement piece. When the key server 53 has received a key request from the node 51, the key request requesting the decryption keys used for decrypting the encrypted piece obtained by encrypting an advertisement piece and containing the node ID string, the encrypted symmetric key string, the content ID, and the version information (step S60: Yes), the key server 53 performs a version judging process (step S61). More specifically, the key server 53 compares the version information that has been received at step S60 with the most updated version information that corresponds to the content ID that has been received at step S60 together with the version information. In the case where the numerical value of the received version information is equal to or larger than the numerical value of the most updated version information (step S62: Yes), in other words, in the case where the advertisement piece is of a new version, the key server 53 determines that the symmetric keys serving as the decryption keys used for decrypting the encrypted piece should be transmitted to the node 51 and performs the processes at step S41 and thereafter in the same manner as described in the first embodiment. On the contrary, at step S61, in the case where the numerical value of the received version information is smaller than the numerical value of the most updated version information (step S62: No), in other words, in the case where the advertisement piece is of an old version, the key server 53 determines that the symmetric keys should not be transmitted to the node 51 and transmits an error message indicating as such to the node 51 that has transmitted the key request received at step S60 (step S63).

Another arrangement is also acceptable in which the key server 53 determines that other symmetric keys should not be transmitted to the node 51 either, the other symmetric key serving as the decryption key used for decrypting an encrypted piece obtained by encrypting such a content piece with which the same content ID is kept in correspondence as the content ID with which the advertisement piece that has been judged to be of an old version is kept in correspondence. In this situation, for example, for each of all the encrypted pieces that constitute the distributed data, the node 51 transmits a key request to the key server 53 to request the decryption key used for decrypting the encrypted piece. At this time, for each of the encrypted pieces, the node 51 puts a content ID and version information together with a node ID string and an encrypted symmetric key string into the key request and transmits the key request to the key server 53. In the same manner as described above, the key server 53 compares the version information contained in the key request with the most updated version information that corresponds to the content ID received at step S60 together with the version information and performs the version judging process. As a result, in the case where the key server 53 has determined that the advertisement piece is of an old version, the key server 53 determines that none of the symmetric keys used for decrypting the encrypted pieces should be transmitted to the node 51.

In the manner described above, only in the case where the node 51 has obtained new advertisement data, the transmission of the decryption key used for decrypting the encrypted pieces is permitted. Although advertisement data can be updated from time to time, it is possible, as an advantageous effect of this arrangement, to promote obtainment of new advertisement data at all times. Thus, it is possible to improve the level of convenience for those who provide the distributed data.

The present invention is not limited to the exemplary embodiments described above. During the actual implementation of the present invention, it is possible to embody the invention while modifying the constituent elements without departing from the gist of the invention. In addition, various inventions may be formed by combining, as necessary, two or more of the constituent elements described in the exemplary embodiments above. For example, one or more of the constituent elements described in the exemplary embodiments may be omitted. Further, one or more of the constituent elements presented in mutually different exemplary embodiments may be used in combination, as necessary. Furthermore, it is possible to apply any of the various modifications described below to the present invention.

In the embodiment described above, an arrangement is acceptable in which the various types of programs executed by each node 50 are stored in a computer connected to a network such as the Internet so that the programs are provided as being downloaded via the network. Another arrangement is acceptable in which the various types of programs are provided as being recorded on a computer-readable recording medium such as a CD-ROM, a flexible disk (FD), a Compact Disk Recordable (CD-R), or a Digital Versatile Disk (DVD), in a file that is in an installable format or in an executable format. In that situation, the programs are loaded into a main storage device (e.g., the RAM) when each node 50 reads and executes the programs from the recording medium described above, so that the constituent elements explained in the description of the functional configurations are generated in the main storage device. The same applies to the various types of programs executed in the key server 53.

Further, in the exemplary embodiments described above, another arrangement is acceptable in which all or a part of the constituent elements explained in the description of the functional configurations of each node 50 are configured by using hardware. The same applies to all or part of the constituent elements explained in the description of the functional configurations of the key server 53.

In the exemplary embodiments described above, the node ID may be any type of information as long as it is possible to uniquely identify each of the nodes. The node ID may be, for example, an Internet Protocol (IP) address, a Media Access Control (MAC) address, or a Universal Resource Locator (URL) of each of the nodes. Alternatively, the node ID may be the public key that is assigned to each of the nodes in advance.

In the data distribution systems according to the exemplary embodiments described above, the number of distribution starting node may be two or more. Also, there is no particular limitation as to the number of nodes that are connected to the P2P network NT besides the one or more distribution starting nodes.

In the exemplary embodiments described above, another arrangement is acceptable in which a plurality of pieces are requested in one piece request. In this situation, the node 50 or the node 51 transmits, for each of the plurality of pieces, a set made up of an encrypted piece, a node ID string, and an encrypted symmetric key string as described above, to the other node 51 that has transmitted the piece request.

Further, in the exemplary embodiments described above, the node 50 or the node 51 transmits the encrypted piece in response to the piece request; however, the present invention is not limited to this example. Another arrangement is acceptable in which the node 50 or the node 51 transmits, to the other node 51, the ID node string and the encrypted symmetric key string together with the encrypted piece, without having received any piece request.

In the exemplary embodiments described above, another arrangement is acceptable in which the node 51 transmits, to the key server 53, the key request requesting the decryption keys used for decrypting each of the encrypted pieces, after the encrypted pieces corresponding to all the pieces that constitute the distributed data have been obtained and stored into the data storage unit 517. Alternatively, yet another arrangement is acceptable in which the node 51 transmits, to the key server 53, the key request requesting the decryption keys used for decrypting the encrypted pieces stored in the data storage unit 517, even if the encrypted pieces corresponding to all the pieces that constitute the distributed data have not yet been obtained. Further, by sending one key request, the node 51 may request the decryption keys used for decrypting one encrypted piece or may request the decryption keys used for decrypting a plurality of encrypted pieces.

In the exemplary embodiments described above, the random number is used as the temporary information; however, the present invention is not limited to this example. Another arrangement is acceptable in which a time stamp indicating the date and time of the current point in time is used as the temporary information.

Further, in the exemplary embodiments described above, the node 50 or the node 51 performs the encrypting process on a piece or an encrypted piece by using the temporary information itself as the symmetric key; however, the present invention is not limited to this example. Another arrangement is acceptable in which the node 50 or the node 51 generates an encryption key by applying some kind of process to the temporary information, so as to perform the encrypting process on the piece or the encrypted piece by using the generated encryption key. For example, an arrangement is acceptable in which the node 50 or the node 51 performs the encrypting process on the piece or the encrypted piece by using the encrypted symmetric key described above.

In the exemplary embodiments described above, the temporary information is used as the symmetric key that serves both as the encryption key used in the encrypting process of the piece and as the decryption key used for decrypting the encrypting process that has been performed on the encrypted piece. However, another arrangement is acceptable in which the encryption key used in the encrypting process of the piece is different from the decryption key used for decrypting the encrypting process that has been performed on the encrypted piece.

Further, in the exemplary embodiments described above, the node 50 or the node 51 generates a random number used as a symmetric key every time the node 50 or the node 51 transmits an encrypted piece stored in the data storage unit 517 to another node 51. However, another arrangement is acceptable in which, instead of generating a random number each time, the node 50 or the node 51 generates a random number according to the number of times of transmission of encrypted pieces. For example, an arrangement is acceptable in which the node 50 or the node 51 generates a new random number once every predetermined number of transmissions of encrypted pieces (e.g., once every five transmissions). With regard to the time at which the node 50 or the node 51 generates the random number, the node 50 or the node 51 may generate a random number when having received a piece request from another node 51 or may generate a random number once every predetermined period of time.

In the exemplary embodiments described above, the node 50 or the node 51 encrypts the symmetric key used in the encrypting process of the encrypted piece by using the public key and transmits the encrypted symmetric key to the other node 51. However, another arrangement is acceptable in which the node 50 or the node 51 transmits the symmetric key without encrypting the symmetric key. In other words, another arrangement is acceptable in which the decryption key information used for decrypting the encrypted piece is the symmetric key itself. The data distribution system with such a configuration does not necessarily have to include the key server 53. In this situation, the node 50 or the node 51 does not have to transmit the node ID together with the encrypted piece to the other node 51. Also, in this situation, the other node 51 on the reception side stores only the encrypted piece and the symmetric key that have been transmitted into the data storage unit 517, while keeping them in correspondence with each other. Further, in this situation, the node 50 or the node 51 on the transmission side encrypts the encrypted piece by using the symmetric key that is the random number generated by the node and transmits, to the other node 51, the symmetric key and the symmetric keys stored in the data storage unit 517 (which are called "a symmetric key string"), together with the encrypted piece. When the node 51 decrypts the encrypted piece, the node 51 decrypts the encrypted piece by using the symmetric key string stored in the data storage unit 517 in correspondence with the encrypted piece. With these arrangements, it is possible to simplify the configuration of the data distribution system. In addition, the way in which the encrypted piece is transmitted after being encrypted in a multiple manner is the same as the one used in the exemplary embodiments described above. Thus, it is possible to protect the encrypted piece that is the target of the transmission.

In the exemplary embodiments described above, before transmitting an encrypted piece stored in the data storage unit 517 to the other node 51, the node 51 encrypts the encrypted piece by using the symmetric key. In this situation, another arrangement is acceptable in which the node 51 encrypts a part of the data of the encrypted piece (instead of the entirety of the data of the encrypted piece) by using the symmetric key. In this situation, the node 51 encrypts the part of the data of the encrypted piece in such a manner that there is an overlapping portion between the data encrypted by the nodes 51 that are involved in the distribution of the encrypted piece and the data encrypted by the other node 51 that is also involved in the distribution of the encrypted piece. With this arrangement, it is possible to reduce the processing loads on the nodes 51 related to the encrypting processes. In addition, because the encrypted portions overlap each other, it is possible to reduce the impacts that will be caused in the case where the decryption keys are disclosed.

Figures 10, 11:
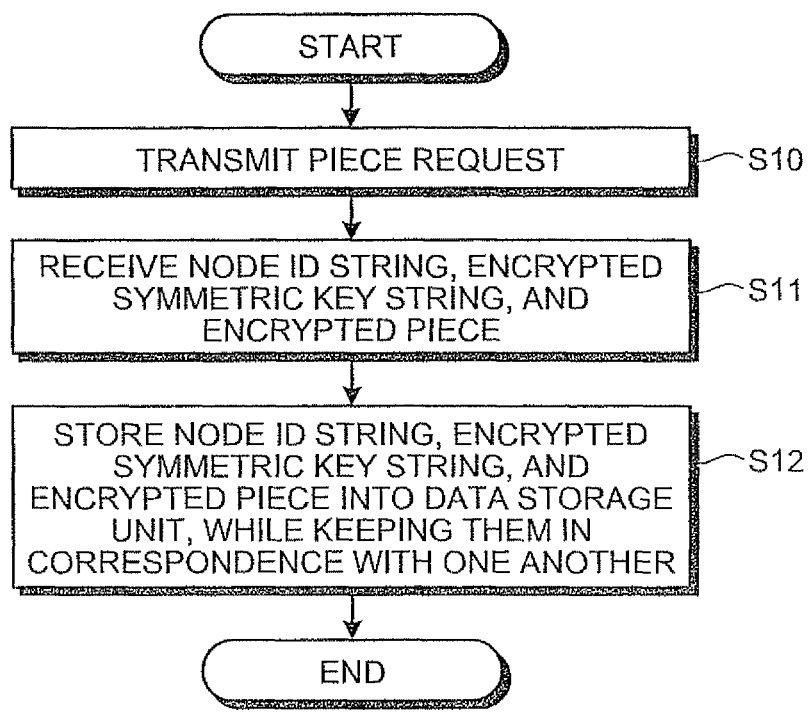
FIG. 10 is a flowchart of a procedure in a receiving process in which the node 51 receives an encrypted piece from the node 50 or another node 51, according to the first embodiment.
FIG. 11 is a schematic drawing of information received by a node according to the first embodiment.

In the exemplary embodiments described above, the node ID string and the encrypted symmetric key string that are transmitted together with the encrypted piece from the node 51 to the other node 51 do not necessarily have to be configured as shown in FIG. 5, FIG. 11, or FIG. 13. For example, another arrangement is acceptable in which, for each of the node IDs, a set made up of a node ID and an encrypted symmetric key corresponding to the node ID is shown as follows: (ID#0, EP(y_0)W_0), (ID#1, EP(y_1)W_1), . . . , (ID#j, EP(y_j)W_j).

In the exemplary embodiments described above, each of all the nodes that are involved in the distribution of the encrypted pieces encrypts an encrypted piece stored therein by using a symmetric key and transmits the encrypted piece that has been encrypted to another node. However, another arrangement is acceptable in which one or more of the nodes that are involved in the distribution of the encrypted pieces do not perform any encrypting process. In this situation, each of such nodes does not generate a random number as the symmetric key, but transmits the encrypted piece stored therein and the node ID and the encrypted symmetric key that are stored therein in correspondence with the encrypted piece to the other node. In other words, each of such nodes transmits the node ID string and the encrypted symmetric key string to the other node, without adding the node ID of its own to the node ID string and without adding any new encrypted symmetric key to the encrypted symmetric key string stored therein in correspondence with the encrypted piece. Even with these arrangements, there are a sufficient number of mutually different combinations of encrypted pieces. Thus, it is possible to sufficiently enhance the uniqueness for each of the nodes with respect to the combination of encrypted pieces obtained by the node.

In the exemplary embodiments described above, the public key is used as the assigned information that is uniquely assigned to each of the nodes 50 and 51, whereas the secret key is used as the correspondence information corresponding to the assigned information. However, it is acceptable to use other symmetric keys that are different from the symmetric keys described above as the assigned information and to use the symmetric keys themselves as the correspondence information. In other words, another arrangement is acceptable in which each of the nodes 50 and 51 stores therein a symmetric key that is unique to the node instead of the public key, so that the key server 53 stores therein these symmetric keys.

In the exemplary embodiments described above, the public key is uniquely assigned to each of the nodes 50 and 51; however, the present invention is not limited to this example. For example, another arrangement is acceptable in which the public keys respectively assigned to the nodes 50 and 51 are all the same. In this situation, each of the nodes 50 and 51 does not have to transmit a node ID string when transmitting an encrypted piece to the other node 51. Yet another arrangement is acceptable in which, when transmitting a key request to the key server 53, each of the nodes 51 transmits a key request that contains only an encrypted symmetric key string, but does not contain any node ID string. The reason is that, in this situation, the secret key to be used in the decrypting process is the same for all the nodes 50 and 51, regardless of which one of the nodes 50 and 51 has obtained the encrypted symmetric key by encrypting the symmetric key with the public key. Further, yet another arrangement is acceptable in which mutually the same public key is assigned to some of the nodes 50 and 51.

In the exemplary embodiments described above, an arrangement is acceptable in which the encrypted piece, the node ID string, and the encrypted symmetric key string are distributed in the form of packaged data in which these pieces of information are packaged together. In this situation, the packaged data may be provided to the node as being recorded on a computer-readable recording medium or may be downloaded into the node via a server. In the same manner as described in the exemplary embodiments, in response to a piece request, the node that has obtained the packaged data encrypts the encrypted piece contained in the packaged data by using the symmetric key generated by the node and transmits, to the other node, the encrypted piece that has been encrypted, together with the node ID string contained in the packaged data and the node ID of its own, as well as the encrypted symmetric key string contained in the packaged data and the encrypted symmetric key obtained by encrypting the symmetric key with the public key assigned to the node.

In the exemplary embodiments described above, another arrangement in particular is acceptable in which all the nodes share, in advance, a number g that is used as the base, so that each of the nodes stores therein a public key that is generated by using the number g and is assigned to the node in advance. For example, let us discuss an example in which the public key that is assigned in advance to the node identified with the node ID ID#j is expressed as "$y\_j = g^{\{x\_j\}}$", where the symbol "^" denotes exponentiation. In this situation, the secret key corresponding to this public key is the exponent "$x\_j$", which is stored in the key server 53.

In the following sections, let us assume that a node ID ID#1 is assigned to the distribution starting node 50. When the distribution starting node 50 transmits a piece P to another node that is identified with a node ID ID#2, the distribution starting node 50 generates a symmetric key W and a random number $r\_1$ as temporary information. The distribution starting node 50 obtains a symmetric key $W\_1$ by encrypting the symmetric key W by using $y\_1^{\{r\_1\}}$. In this situation, $W\_1 = W*y\_1^{\{r\_1\}}$ is satisfied, and the symbol "*" denotes multiplication. The distribution starting node 50 sequentially encrypts the piece P by using W and $W\_1$ and transmits the encrypted piece $E(W\_1)E(W)P$ to the node identified with the node ID ID#2. In addition, the distribution starting node 50 transmits, to the node identified with the node ID ID#2, the node ID of the distribution starting node 50 (i.e., the node ID ID#1), the exponentiation of the base g expressed as $g^{\{r\_1\}}$, and the symmetric key $W\_1$. In this situation, the exponentiation of the base g and the symmetric key serve as the decryption key information used for decrypting the encrypting process performed by the communication apparatus and are the information that is identifiable based on the correspondence relationship with the node ID.

Next, an operation performed by each of the nodes will be explained in an inductive manner. A node that is in the j'th position on the distribution path and to which a node ID ID#j is assigned receives an encrypted piece $E(W\_{j-1})E(W\_{j-2})\ldots E(W\_1)E(W)P$ from the node that is in the immediately-preceding position on the distribution path (i.e., the (j−1)'th position) and to which a node ID ID#{j−1} is assigned. The node identified with the node ID ID#j also receives a node ID string containing the node IDs of the nodes that have been involved in the encrypting processes of the encrypted piece and are positioned on the distribution path, an exponentiation string containing exponentiations of the base g, and a symmetric key string containing a symmetric key $W\_{j-1}$, all of which can be expressed as below:
ID#1, ID#2, ..., ID#{j−1}; $g^{\{r\_1\}}, g^{\{r\_2\}}, \ldots, g^{\{r\_{j-1}\}}$; W{j−1}.

The node that is identified with the node ID ID#j stores the received encrypted piece $E(W\_{j-1})E(W\_{j-2})\ldots E(W\_1)E(W)P$ into the data storage unit. Also, the node identified with the node ID ID#j stores the node ID string, the exponentiation string, and the symmetric key string into the data storage unit. When the node identified with the node ID ID#j transmits an encrypted piece to the node that is in the immediately-following position on the distribution path (i.e., the (j+1)'th position) and is identified with a node ID ID#{j+1}, the node identified with the node ID ID#j performs the following operation: The node generates a random number $r\_j$ and calculates the exponentiation of the base g expressed as $g^{\{r\_j\}}$; the node also calculates the value of "$W\_j = W\_{j-1}*y\_j^{\{r\_j\}}$", encrypts the encrypted piece stored in the data storage unit by using $W\_j$, and outputs an encrypted piece expressed as $E(W\_j)E(W\_{j-1})\ldots E(W\_1)E(W)P$. Further, the node transmits, to the immediately-following node in the (j+1)'th position, the encrypted piece expressed as $E(W\_j)E(W\_{j-1})\ldots E(W\_1)E(W)P$, together with a new node ID string that contains the node ID of its own in addition to the node ID string stored in the data storage unit in correspondence with the encrypted piece before the encrypting process is performed; a new exponentiation string that contains an exponentiation of the base g that has been calculated by the node in addition to the exponentiation string stored in the data storage unit in correspondence with the encrypted piece; and the symmetric key $W\_j$, all of which can be expressed as below:
ID#1, ID#2, ..., ID#j; $g^{\{r\_1\}}, g^{\{r\_2\}}, \ldots, g^{\{r\_j\}}$; $W\_j$.

Next, an operation performed by the node identified with the node ID ID#j when decrypting the encrypted piece will be explained. The node identified with the node ID ID#j transmits a key request to the key server 53, the key request containing the node ID string that is in correspondence with the encrypted piece stored in the data storage unit, the exponentiation string of the base g, and the symmetric key $W\_{j-1}$, all of which can be expressed as below, and requesting the decryption keys used for decrypting the encrypted piece:
ID#1, ..., ID#{j−1}; $g^{\{r\_1\}}, \ldots, g^{\{r\_{j-1}\}}$; $W\_{j-1}$.

In response to the key request, the key server 53 calculates a value D as shown below by using the secret keys stored therein expressed as $x\_1, \ldots x\_{j-1}$:
$D = \{g^{\{r\_1\}}\}^{\{x\_1\}} * \{g^{\{r\_2\}}\}^{\{x\_2\}} * \ldots * \{g^{\{r\_{j-1}\}}\}^{\{x\_{j-1}\}}$.

After that, the key server 53 sequentially calculates the values of $W, W\_1, \ldots,$ and $W\_{j-1}$ that can be expressed as shown below:
$W = W\_{j-1}/D$; $W\_1 = \{g^{\{r\_1\}}\}^{\{x\_1\}}, \ldots ; W\_{j-1} = \{g^{\{r\_{j-1}\}}\}^{\{x\_{j-1}\}}$.

In these expressions, the symmetric keys $W, W\_1, \ldots,$ and $W\_{j-1}$ serve as the decryption keys that are based on the temporary information.

Subsequently, the key server 53 transmits the symmetric keys expressed as $W, W\_1, \ldots,$ and $W\_{j-1}$ to the node identified with the node ID ID#j that has transmitted the key request.

On the other hand, when having received the symmetric keys expressed as $W, W\_1, \ldots, W\_{j-1}$ from the key server 53, the node identified with the node ID ID#j sequentially decrypts the encrypted piece expressed as $E(W\_{j-1})\ldots E(W\_1)E(W)P$, by using the symmetric keys $W\_{j-1}, \ldots, W\_1, W$ and obtains the piece P in plain text.

Generally speaking, the cost of decrypting calculations related to public key encryption is high. By using the configuration described above, however, it is possible to reduce the calculation costs at the key server.

In the second embodiment described above, another arrangement is acceptable in which the key server 53 prompts the node to obtain advertisement data that contains the most updated version information (hereinafter, the "most updated advertisement data"). For example, whenever necessary, the key server 53 stores therein connection information used for establishing a connection to the most updated advertisement node that distributes the most updated advertisement data. In the case where the result of the judging process at step S62 is in the negative, the key server 53 transmits the connection information to the node 51 that has transmitted the key request received at step S60. The connection information may be, for example, an IP address or a URL. To obtain the most updated advertisement data, the node that has received the connection information attempts to connect to the most updated advertisement node according to the connection information and attempts to obtain the most updated advertisement data.

In the second embodiment described above, another arrangement is acceptable in which the version information is protected by having an electronic signature attached thereto, so that the node 51 is not able to falsify the version information to be transmitted to the key server 53. In this situation, the key server 53 verifies the electronic signature attached to the received version information and, only in the case where the result of the verification is proper, the key server 53 compares the version information with the most updated version information.

Further, in the second embodiment described above, another arrangement is acceptable in which, in the case where the distributed data contains a plurality of units of advertisement data that are of mutually different types, the key server 53 stores therein pieces of most updated version information respectively corresponding to the different types of advertisement data. In this situation, for example, yet another arrangement is acceptable in which each of the units of advertisement data contains type information identifying the type of the unit of advertisement data, so that the node 50 puts type information into each of the pieces obtained by dividing the advertisement data. When transmitting a key request to the key server 53, each of the nodes 51 puts type information as well as the version information and the content ID into the key request. On the other hand, the key server 53 stores therein the most updated version information in correspondence with the content ID and the type information and compares the version information contained in the key request with the most updated version information that is kept in correspondence with the content ID and the type information.

In the second embodiment described above, the distributed data contains the content ID that is uniquely assigned; however, another arrangement is acceptable in which the distributed data contains no content ID.

In the second embodiment described above, the version information is used as the comparison management information that makes it possible to compare the level of newness of the advertisement data; however, the present invention is not limited to this example. Another arrangement is acceptable in which, for example, a time stamp indicating the date on which the advertisement data was created is used as the comparison management information.

Further, yet another arrangement is acceptable in which the version information contained in each of the advertisement pieces is a hash value of the original text (i.e., plain text) of the advertisement piece.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication apparatus that encrypts a plurality of pieces that constitutes a part of data and transmits the encrypted pieces, the apparatus comprising:
   a first storage unit that correspondingly stores an encrypted piece that is one of the pieces encrypted by another communication apparatus, and first decryption key information used for decrypting the encrypted piece;
   a first generating unit that generates temporary information that is different at each time of generation;
   an encrypting unit that further performs an encrypting process on said encrypted piece based on the temporary information and outputs a new encrypted piece;
   a transmitting unit that transmits the new encrypted piece, the first decryption key information stored in the first storage unit in correspondence with the encrypted piece, and second decryption key information used for decrypting the encrypting process performed by the encrypting unit all together; and
   a microprocessor configured to execute at least the encrypting unit and the transmitting unit.

2. The apparatus according to claim 1, wherein
   the first storage unit correspondingly stores the encrypted piece and the first decryption key information that is temporary information used by the another communication apparatus when performing an encrypting process,
   the encrypting unit further performs the encrypting process on said encrypted piece by using the temporary information as an encryption key and outputs the new encrypted piece, and
   the transmitting unit transmits, to the another communication apparatus, the new encrypted piece, the first decryption key information stored in the first storage unit in correspondence with the encrypted piece, and the second decryption key information that is the temporary information used by the encrypting unit to perform the encrypting process on the encrypted piece.

3. The apparatus according to claim 1, further comprising a request receiving unit that receives a piece request requesting one of the pieces, wherein
   the first generating unit generates the temporary information when the request receiving unit has received the piece request, and
   the transmitting unit transmits the new encrypted piece, the first decryption key information, and the second decryption key information, when the request receiving unit has received the piece request.

4. The apparatus according to claim 1, further comprising a second storage unit that stores apparatus identification information that is uniquely assigned to the communication apparatus, wherein
   the first storage unit correspondingly stores the encrypted piece, apparatus identification information of the another communication apparatus, and the first decryption key information with which it is possible to identify a decryption key used for decrypting an encrypting process performed on the encrypted piece, based on a correspondence relationship with the apparatus identification information, and
   the transmitting unit transmits, to the another communication apparatus, the new encrypted piece; the apparatus identification information stored in the second storage unit; the apparatus identification information stored in the first storage unit in correspondence with the encrypted piece; the first decryption key information stored in the first storage unit in correspondence with the encrypted piece; and the second decryption key information with which it is possible to identify a decryption key used for decrypting the encrypting process performed by the encrypting unit, based on a correspondence relationship with the apparatus identification information.

5. The apparatus according to claim 4, wherein
the second storage unit further stores a public key assigned to the communication apparatus,
the encrypting unit further performs the encrypting process on said encrypted piece by using the temporary information as an encryption key and outputs the new encrypted piece, and
the apparatus further comprises a second generating unit that generates the second decryption key information by using the temporary information and the public key.

6. The apparatus according to claim 4, further comprising a receiving unit that receives, from yet another communication apparatus, the encrypted piece; the apparatus identification information of the another communication apparatus; apparatus identification information of the yet another communication apparatus; the first decryption key information used for decrypting the encrypting process performed by the another communication apparatus; and the first decryption key information used for decrypting an encrypting process performed by the yet another communication apparatus, wherein
the first storage unit correspondingly stores the received encrypted piece, the apparatus identification information, and the first decryption key information.

7. A communication apparatus that receives a plurality of pieces constituting a part of data from communication apparatuses, the apparatus comprising:
a first receiving unit that receives all together, an encrypted piece that is one of the pieces on which encrypting processes have been performed by a plurality of other communication apparatuses, apparatus identification information that is uniquely assigned to each of the plurality of other communication apparatuses, and decryption key information with which it is possible to identify decryption keys respectively used for decrypting the encrypting processes performed by the plurality of other communication apparatuses based on a correspondence relationship with the apparatus identification information;
a first storage unit that correspondingly stores the received encrypted piece, the apparatus identification information, and the decryption key information; a transmitting unit that transmits a key request to a key server, the key request requesting the decryption keys used for decrypting the encrypted piece and correspondingly containing the apparatus identification information and the decryption key information stored in correspondence with the encrypted piece;
a second receiving unit that receives the decryption keys transmitted from the key server in response to the key request;
a decrypting unit that decrypts the encrypted piece by using the received decryption keys; and
a microprocessor configured to execute at least the decrypting unit.

8. The apparatus according to claim 7, wherein the first receiving unit receives the encrypted piece, the apparatus identification information, and the decryption key information, the decryption key information being generated by using temporary information that is different at each time of generation and public keys that are respectively assigned to the other communication apparatuses, the temporary information having been used by the other communication apparatuses when performing the encrypting processes on the piece.

9. The apparatus according to claim 7, wherein the second receiving unit receives, from the key server, the decryption keys that are the temporary information.

10. The apparatus according to claim 7, wherein
one of the plurality of pieces is an advertisement piece that is data for an advertisement purpose and contains comparison management information that makes it possible to compare a level of newness thereof,
the apparatus further comprises an extracting unit that extracts the comparison management information contained in the encrypted piece, when the encrypted piece stored in the first storage unit is an encrypted piece obtained by encrypting the advertisement piece, and
the transmitting unit transmits, to the key server, the key request that contains the apparatus identification information, the decryption key information, and the comparison management information.

11. A key server comprising:
a first storage unit that correspondingly stores secret keys that corresponds to public keys assigned to each of a plurality of communication apparatuses that encrypt a plurality of pieces that constitute a part of data and transmit the encrypted pieces, and apparatus identification information that is uniquely assigned to each of the plurality of communication apparatuses;
a receiving unit that receives a key request from another communication apparatus other than the plurality of communication apparatuses, the key request requesting decryption keys used for decrypting an encrypted piece that is one of the pieces on which encrypting processes have been performed by the plurality of communication apparatuses and correspondingly containing the apparatus identification information of the plurality of communication apparatuses and decryption key information, the decryption key information being related to the encrypting processes respectively performed by the plurality of communication apparatuses and having been generated by using temporary information that is different at each time of generation and the public keys;
an obtaining unit that, based on the key request, obtains the temporary information by using the secret keys stored in correspondence with the apparatus identification information contained in the key request, and the decryption key information contained in the key request in correspondence with the apparatus identification information, the temporary information being obtained by decrypting the decryption key information by using the secret keys;
a transmitting unit that transmits, to the another communication apparatus, the obtained temporary information as the decryption keys; and
a microprocessor configured to execute at least the transmitting unit.

12. A non-transitory computer readable storage medium storing therein data that is obtained by encrypting a piece that constitutes a part of distributed data and is transmitted from a communication apparatus, the data comprising:
an encrypted piece that is the piece encrypted by each of a plurality of communication apparatuses, based on temporary information that is different at each time of generation in correspondence with each of the plurality of communication apparatuses;

apparatus identification information that is uniquely assigned to each of the plurality of communication apparatuses; and decryption key information with which it is possible to identify decryption keys used for decrypting encrypting processes that have respectively been performed in correspondence with the plurality of communication apparatuses based on a correspondence relationship with the apparatus identification information, the encrypted piece, the apparatus identification information, and the decryption key information contained in the data being kept in correspondence with one another, wherein the data includes the encrypted piece, the apparatus identification information, and the decryption key information as a single unit.

13. The medium according to claim 12, wherein the decryption key information is information generated by using the temporary information used in an encrypting process in correspondence with the communication apparatus, and a public key assigned to the communication apparatus.

* * * * *